United States Patent
Li et al.

(10) Patent No.: US 11,533,648 B2
(45) Date of Patent: *Dec. 20, 2022

(54) DETECTING COMMUNICATION NETWORK INSIGHTS OF ALERTS

(71) Applicant: Meta Platforms, Inc., Menlo Park, CA (US)

(72) Inventors: Ying Li, Menlo Park, CA (US); Martinus Arnold de Jongh, Santa Clara, CA (US); Vincent Gonguet, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/932,483

(22) Filed: Jul. 17, 2020

(65) Prior Publication Data
US 2020/0351698 A1    Nov. 5, 2020

Related U.S. Application Data

(63) Continuation of application No. 16/226,477, filed on Dec. 19, 2018, now Pat. No. 10,779,183, which is a
(Continued)

(51) Int. Cl.
*H04W 28/02* (2009.01)
*H04W 28/24* (2009.01)
*G06N 20/00* (2019.01)

(52) U.S. Cl.
CPC ... *H04W 28/0226* (2013.01); *H04W 28/0268* (2013.01); *H04W 28/0289* (2013.01); *H04W 28/24* (2013.01); *G06N 20/00* (2019.01)

(58) Field of Classification Search
None
See application file for complete search history.

(56) References Cited

U.S. PATENT DOCUMENTS

2015/0373574 A1   12/2015   Gordon et al.
2016/0065419 A1    3/2016   Szilagyi
(Continued)

FOREIGN PATENT DOCUMENTS

WO    2016091292 A1    6/2016

OTHER PUBLICATIONS

EESR for Application No. 18926413.8-1218, dated Jul. 16, 2021, 7 pages.
(Continued)

*Primary Examiner* — Saumit Shah
(74) *Attorney, Agent, or Firm* — Baker Botts L.L.P.

(57) ABSTRACT

In one embodiment, a computing system receives a request for a quality of experience report associated with a plurality of geographic areas connected by a communication network. The system accesses a plurality of quality of experience metrics from the plurality of geographic areas. The system identifies one or more of the plurality of geographic areas that have low quality of experiences based on their respective quality of experience metrics and a set of criteria which includes one or more thresholds corresponding to the quality of experience metrics. The system determines for each identified geographic area, a severity of the low quality of experiences. The severity is based on a connection demand metric associated with each geographic area. The system sends instructions for presenting the quality of experience report which indicates the severity of the low quality of experiences for each identified geographic area.

17 Claims, 20 Drawing Sheets

Related U.S. Application Data continuation-in-part of application No. 16/155,510, filed on Oct. 9, 2018, now Pat. No. 10,764,184.

(60) Provisional application No. 62/752,908, filed on Oct. 30, 2018, provisional application No. 62/699,312, filed on Jul. 17, 2018.

(56) References Cited

U.S. PATENT DOCUMENTS

| | | |
|---|---|---|
| 2016/0112894 A1 | 4/2016 | Lau |
| 2016/0174081 A1 | 6/2016 | Lau |
| 2017/0078171 A1 | 3/2017 | Tapia et al. |
| 2017/0171042 A1* | 6/2017 | Tofighbakhsh ......... H04L 41/22 |
| 2018/0270126 A1* | 9/2018 | Tapia .................. H04L 41/5009 |

OTHER PUBLICATIONS

International Search Report and Written Opinion for International Application No. PCT/US2018/067120, dated Apr. 23, 2019, 11 Pages.

Wang C., et al., "Identifying Persistent and Recurrent QoE Anomalies for DASH Streaming in the Cloud," 2017 IEEE International Conference on Cloud Computing Technology and Science, Dec. 28, 2017, pp. 263-271.

* cited by examiner

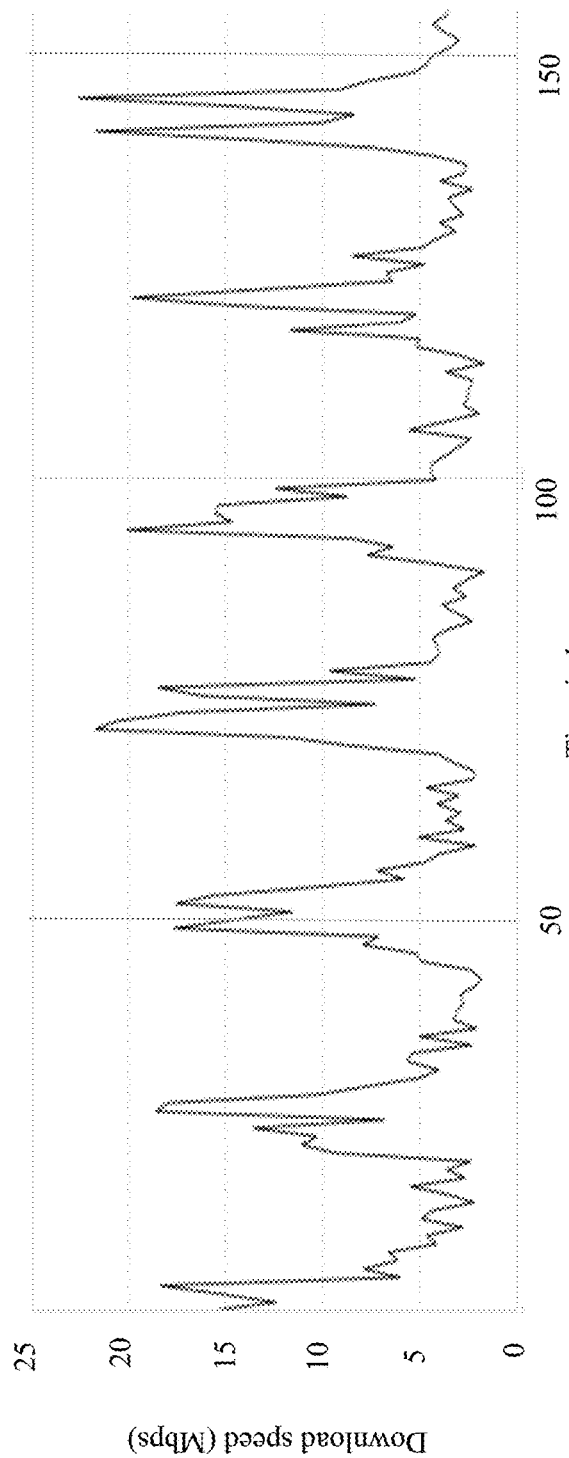
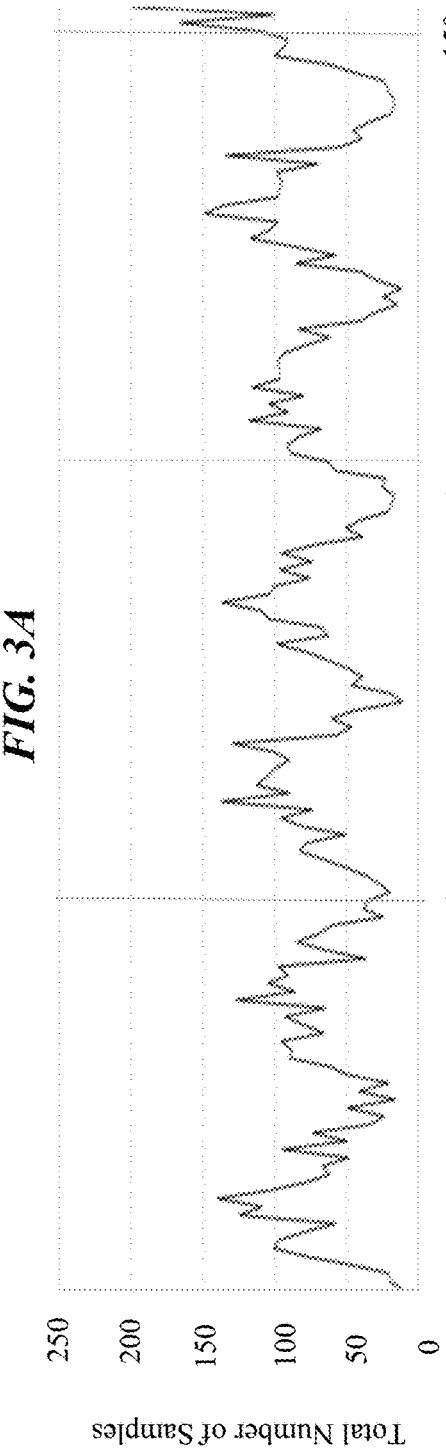
FIG. 3A
FIG. 3B

| Cell ID | Quality of Experience (QoE) Metrics | | | Root-cause Metrics | | |
|---|---|---|---|---|---|---|
| | Download Speed (Kbps) | Download Speed at Busy Hours (Kbps) | Latency (ms) | Signal Strength | Congestion Metric (worst %) | Number of Samples |
| 1 | 554.6666667 | 444 | 261.5 | 98.04878049 | 0.709642336 | 1252 |
| 2 | 810 | 772 | 170.375 | 90.16666667 | 0.348721521 | 965 |
| 3 | 817.3214351 | 636 | 217.677686 | 107.9829787 | 0.709346514 | 3086 |
| 4 | 883.1883636 | 1136 | 190.5 | -92.5125 | 0.635775953 | 3709 |
| 7 | 1082 | 976 | 208.25 | -109.93 | 0.300881749 | 845 |
| 17 | 1314 | 1164 | 169.75 | -111.7244898 | 0.49601706 | 897 |
| 28 | 1553.34 | 1106 | 139.25 | -109.7294118 | 0.218192959 | 2806 |
| 37 | 1763.044848 | 1256 | 134.6153846 | -111.0430464 | 0.597791068 | 3794 |
| 40 | 1812 | 1710 | 131.25 | -111.8248408 | 0.285618615 | 2403 |
| 44 | 1868 | 1424 | 110.7222222 | -110.9057971 | 0.432166161 | 1071 |

| Cell ID | Quality of Experience (QoE) Metrics | | | Root-cause Metrics | | |
|---|---|---|---|---|---|---|
| | Download Speed | Download Speed at Busy Hours | Latency | Signal Strength Metric | Congestion Metric | Number of Samples |
| 1 | 0.998035363 | 0.998035363 | 1 | 0.206286837 | 0.992141454 | 0.693516699 |
| 2 | 0.996070727 | 0.992141454 | 0.966601179 | 0.029469548 | 0.831041257 | 0.58546169 |
| 3 | 0.99410609 | 0.996070727 | 0.996070727 | 0.609037328 | 0.990176817 | 0.95481336 |
| 4 | 0.992141454 | 0.952848723 | 0.984282908 | 0.062868369 | 0.980353635 | 0.968565815 |
| 7 | 0.986247544 | 0.978388998 | 0.992141454 | 0.748526523 | 0.772102161 | 0.546168959 |
| 17 | 0.964636542 | 0.950884086 | 0.964636542 | 0.858546169 | 0.939096267 | 0.563850688 |
| 28 | 0.939096267 | 0.956777996 | 0.94302554 | 0.734774067 | 0.664047151 | 0.937131631 |
| 37 | 0.913555992 | 0.94302554 | 0.933202358 | 0.815324165 | 0.966601179 | 0.974459725 |
| 40 | 0.905697446 | 0.882121807 | 0.919449902 | 0.864440079 | 0.750491159 | 0.915520629 |
| 44 | 0.893909627 | 0.931237721 | 0.834497053 | 0.807465619 | 0.909626719 | 0.632612967 |

| Cell ID | Quality of Experience (QoE) Metrics | | | Root-cause Metrics | | |
|---|---|---|---|---|---|---|
| | Download Speed | Download Speed at Busy Hours | Latency | Signal Strength Metric | Congestion Metric | Number of Samples |
| 1 | 0.998035363 | 0.998035363 | 1 | | 0.9921141454 | |
| 2 | 0.996070727 | 0.9921141454 | 0.966601179 | | 0.8310041257 | |
| 3 | 0.99410609 | 0.996070727 | 0.996070727 | | 0.990176817 | 0.95481336 |
| 4 | 0.9921141454 | 0.952848723 | 0.984282908 | | 0.980353635 | 0.968565815 |
| 7 | 0.986247544 | 0.978388998 | 0.9921141454 | | | |
| 17 | 0.964636542 | 0.950884086 | 0.964636542 | 0.858546169 | 0.939096267 | |
| 28 | 0.939096267 | 0.956777996 | 0.94302554 | | | 0.937131631 |
| 37 | 0.913555992 | 0.943025540 | 0.933202358 | 0.815324165 | 0.966601179 | 0.974459725 |
| 40 | 0.905697446 | | 0.919449902 | 0.864440079 | | 0.915520629 |
| 44 | | 0.931237721 | | 0.807465619 | 0.909626719 | |

*FIG. 7C*

DETECTING COMMUNICATION NETWORK INSIGHTS OF ALERTS

PRIORITY

This application is a continuation under 35 U.S.C. § 120 of U.S. patent application Ser. No. 16/226,477, filed 19 Dec. 2018, which claims the benefit under 35 U.S.C. § 119(e) of U.S. Provisional Patent Application No. 62/752,908, filed 30 Oct. 2018, which are incorporated herein by reference. U.S. patent application Ser. No. 16/226,477 is also continuation-in-part under 35 U.S.C. § 120 of U.S. patent application Ser. No. 16/155,510, filed 9 Oct. 2018, which claims the benefit under 35 U.S.C. § 119(e) of U.S. Provisional Patent Application No. 62/699,312, filed 17 Jul. 2018, which are incorporated herein by reference.

TECHNICAL FIELD

This disclosure generally relates to communication network, and in particular, to detecting communication network insights of alerts.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of monitoring communication network performance (e.g., network traffic congestions, network coverage issues) and user experience (e.g., network speeds, network latency, signal status) of the end users of communication networks at both front-end and back-end. Particular embodiments of the system may detect network insights of alerts, such as network traffic congestions or network coverage issues in one or more geographic areas covered by a communication network. Particular embodiments may determine one or more network performance metrics for detecting network congestions. For example, the system may firstly identify, in a communication network, one or more areas that have relative high traffic volume. The system may determine, for each identified area, a first average network speed during busy hours of the communication network and a second average network speed during non-busy hours of the communication network. The system may calculate a ratio of the difference between the first and second average network speeds to the first or second average network speed and use the ratio as a network performance metric to gauge the network performance and the quality of the user experience in that area. As another example, the system may determine a congestion metric for each individual area based on reference points associated with a network speed curve (e.g., download speed vs. traffic volume or number of samples). The system may calculate the difference between average download speeds of a first reference point and a second reference point of the network speed curve. The first reference point may be a reference point representing an average or median of the download speed for the relatively flat portion of the download speed curve. The second point could be in the portion of the curve corresponding to the higher end of the traffic volume. The system may calculate a ratio of the difference of the two average download speeds at the two reference points to the average speed at the first or the second reference point and use the ratio as the network performance metric. The system may use a machine learning (ML) model to determine a threshold value for the network performance metric and compare the determined network performance metric with that threshold value. When the network performance metric is below the threshold value, the system may identify a network traffic congestion in that area. The system may rank a number of areas having network traffic congestions using the network performance metric and send congestion alerts to operators about the detected network traffic congestions. The congestion alerts may be ranked by one or more associated attributes including, for example, network performance metrics, locations, median download speed, regional download speed, cell identifications, etc. Particular embodiments of the system may determine one or more network coverage metrics (e.g., signal strength, number of connected towers, signal stability status) and compare the network coverage metrics to respective thresholds for detecting the network coverage issues, as network insights of alerts. Particular embodiments of the system may determine one or more quality of experiences related metrics (e.g., download speed, latency such as round trip time, upstream latency, downstream latency, download speed at busy hours, latency at busy hours, etc.) and compare the quality of experience metrics to respective thresholds for detecting the quality of experiences issues, as network insights of alerts. For example, if one of these quality of experiences related metrics is worse than needed or required threshold, or is among the worst certain percentage, then a quality of experience related issue or network insights of alert could be detected and reported. For another example, if a mapping function of one or multiple of the quality of experiences related metrics is worse than needed or required threshold, or is among the worse certain percentage, then a quality of experience related issue or network insights alert could be detected and reported.

Particular embodiments described here relate to a method of determining root causes of low quality of experience (QoE) of a communication network based on a number of QoE metrics (e.g., download speed, download speed of busy hours, latency) and root-cause metrics (e.g., signal strength, congestion indicator, number of samples). The system may firstly collect application usage data in a number of areas (e.g., cells, tiles, regions) over a duration of N days (e.g., 7 days, 28 days). Then, the system may preprocess the collected data for filtering and cleaning and aggregate the collected data into data points per hour per individual day or per hour all N days. After that, the system may determine one or more QoE metrics and root-cause metrics based on the cleaned and aggregated data. The system may use a first set of criteria to determine low QoE in one or more areas of interest (e.g., cells, tiles, regions). For example, the system may use one or more predetermined low QoE thresholds (e.g., an absolute value threshold, a percentage threshold, a percentile threshold) to identify the low QoE cells based on one or more QoE metrics (e.g., download speed, download speed of busy hours, latency). Then, the system may use a second set of criteria to determine the causes of the low QoE in these areas. For example, the system may determine the cells percentile (e.g., based on root-cause metrics) of each root-cause metric and use one or more root-cause thresholds to filter the root-cause metrics to determine the low QoE root causes in each area with low QoE. The system may generate a report for the low QoE areas with identified causes and generate solution recommendations for optimizing the communication network based on the identified causes. The system may optimize communication network and improve the user experience of end users of the communication network based on generated solution recommendations. In particular embodiments, the area of interest may be an area covered by a group of cells under certain conditions, for example, cells operating at the same frequent band, cells operating at the same frequency bandwidth, cells of the same network generation (e.g., 3G, 4G, 5G), cells operating by a same mobile network operator, etc.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A-C illustrate example data related to network download speed and total number of samples associated with a cell having network congestions.

FIGS. 7A-C illustrate an example process for determining causes for a number of low QoE cells of a cellular network.

DESCRIPTION OF EXAMPLE EMBODIMENTS

Overview

Quality of Experience

Figure 1:
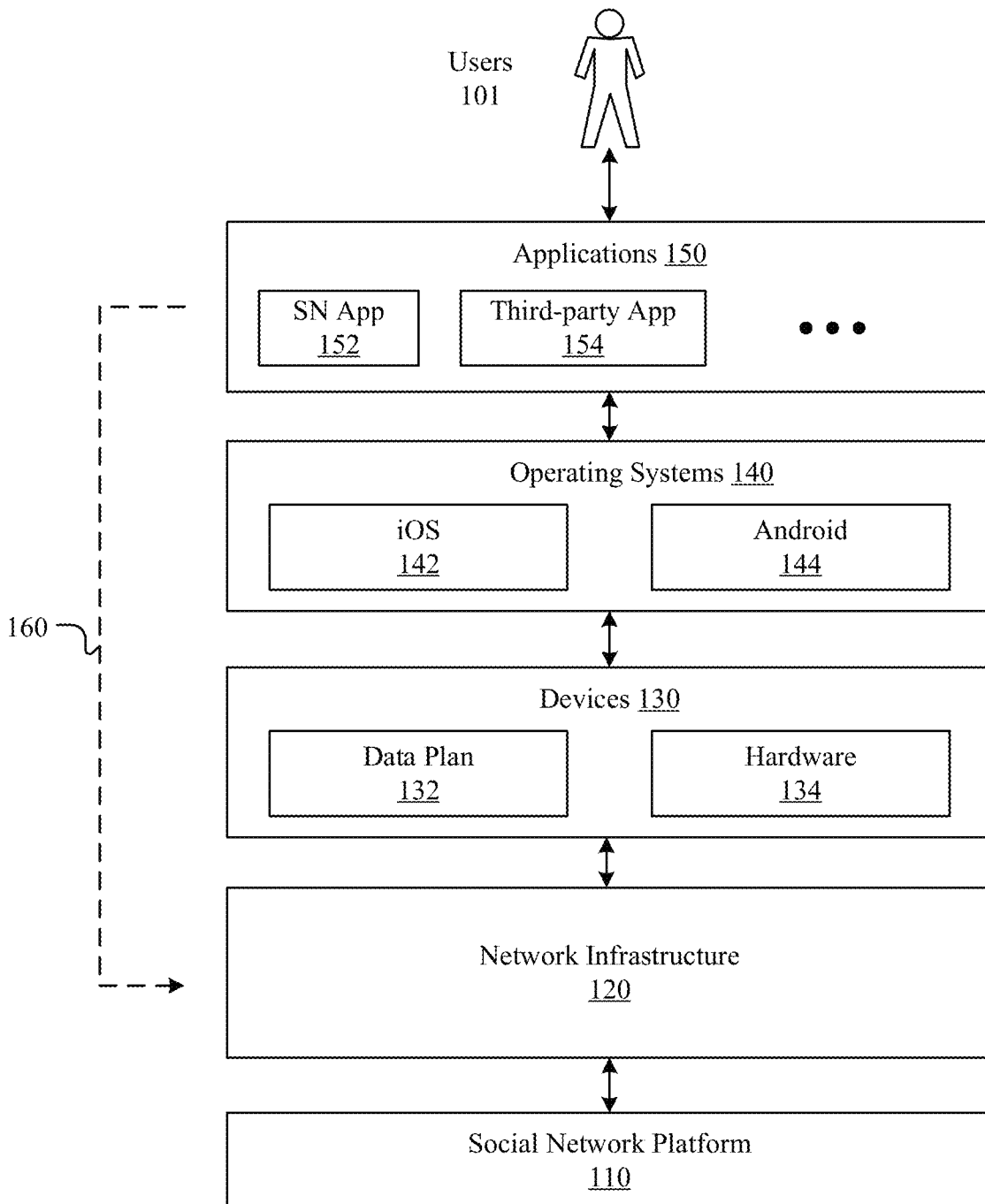
FIG. 1 illustrates an example system for optimizing network infrastructure based on application data.

Quality of experience (QoE) of end users or customers may be a general metric which indicates the degree of satisfactory of end users related to experiences of the applications or services they are using. For example, QoE could include the download speed, the latency, and other parameters, that are related to end users experience at the mobile application level. QoE could also be a metric derived from the download speed or latency (e.g., by a mapping function) to indicate end users satisfactory for the experience. QoE may be one of the most important factor for communication network planning, monitoring, diagnosis, or/and optimization. The mobile network operators (MNOs) of the communication networks may need to understand which geographic areas have unsatisfied QoE and what are the service types (e.g., live video streaming, high-definition video downloading) having low QoE. The MNOs may use this information to reduce the operating expenses (OPEX) (e.g., via reducing the complaints, tickets, lowering the network optimization cost) and to reduce the capital expenditures (CAPEX) (e.g., by most effectively pinpointing out where to add more cells and avoiding adding cells in unnecessary places) of the communication network. The MNOs could also use this information to recover or even boost the traffic volume (implying more revenue), which would have been suppressed due to unsatisfied QoE.

Furthermore, communication network engineering may need deeper insights understanding related to QoE. Such understanding could provide supporting inputs to MNOs for making decisions on whether to optimize the network and which aspect to optimize (e.g., whether to upgrade the network from current generation to next generation, whether to do the network expansion by adding more cells for cell densification, where to add cells) directly or indirectly based on QoE. Particular embodiments of the system may link QoE to wireless communication engineering by providing information about whether the QoE of end users of a particular area (e.g., a cell, a tile, a region) is healthy and what could be the causes for unhealthy QoE from wireless network perspective (e.g., coverage issues, capacity issues, latency issues, other issues). The coverage and the capacity of the communication network may be two of the most important aspects for cellular engineering to understand the status and healthiness of the network. Particular embodiments of the system may use the data collected at the application level to generate models for coverage issues and congestion issues. Particular embodiments of the system may provide a congestion alert model using QoE as a key factor for identifying congestions of the network and generating congestion alerts. Particular embodiments of the system may provide network change requests to the computing devices as an attempt to mitigate further network congestion.

Particular embodiments of the system may determine one or more QoE related metrics (e.g., download speed, latency such as round-trip time, upstream latency, downstream latency, download speed at busy hours, latency at busy hours, etc.) and compare the QoE related metrics to respective thresholds for detecting the quality of experiences issues, as network insights of alerts. For example, if one of these quality of experiences related metrics is worse than the needed or required threshold, or is among the worst certain percentage, then a quality of experience related issue or network insights of alert may be detected and reported. For another example, if a mapping function of one or multiple of the quality of experience related metrics is worse than needed or required threshold, or is among the worse certain percentage, then a quality of experience related issue or network insights of alert may be detected and reported.

Problems

Traditional technologies and systems for optimizing communication networks may monitor network traffic of a large number cellular towers (e.g., 100 k) at network infrastructure level and optimize network performance based on the monitored network traffic. For example, the systems may include instrumentations carried by a measurement vehicle driving around in the network for measuring network performance. However, these technologies and system are very inefficient and limited in capability. For example, they cannot detect network congestion and coverage problems for the large number of cells of cellular networks. Furthermore, the optimization that only relies on network infrastructure level information has many shortcomings which could lead to suboptimal results. For example, although network traffic (e.g., download speed, busy hours, traffic volume, tower performance) at network infrastructure level may be measured, this infrastructure level information may hide information about actual user experience and application usages at application level. Traditional network optimization technologies and systems are lack of effective means to obtain data usage information related to network status (e.g., high definition video downloading or live video streaming associated with a high traffic volume during busy hours, messaging associated with a low network traffic, etc.). Thus, traditional network optimization technologies and systems cannot associate network performance degradation with particular data usage and cannot identify the root causes of network problems at network infrastructure level. As another example, traditional network optimization technologies and systems cannot directly evaluate the QoE of end users because lack of effective means to obtain or access application usage data at application level. When applications and network infrastructure are optimized separately, these optimizations may have suboptimal results and lack feedback information on the effectiveness and impact of the optimizations. As another example, traditional network optimization technologies and systems do not have access the network data of competitive carriers, and therefore lack competitive perspectives (e.g., competitor's network performance or/and optimization actions in particular areas) when optimizing the network at infrastructure level, which may lead to suboptimal network performance comparing to other competitors.

Solution

Particular embodiments of the system may collect application data of users (e.g., application names, application types, time duration, quality of experience, network speed, latency, network coverage) at application level and provide supporting and feedback information to the network infrastructure optimization (e.g., at infrastructure level) based on the collected application data. Particular embodiments of the system may detect network congestions in one or more areas covered by a network and detect network congestions as the basis for network optimization. Particular embodiments of the system may collect data (e.g., application data, network performance data) from networks of multiple carriers and provide competitive perspective for optimizing networks. Particular embodiments of the system may optimize the communication network infrastructure based on user-level data and infrastructure level data.

Benefits

Particular embodiments of the system address the limitations and shortcomings of existing network optimization technologies and systems by providing technological solutions and improvements for monitoring and optimizing the network performance. Particular embodiments of the system may collect user experience data and network performance data at application level, generate network congestion alerts or network coverage alerts, and identify the root causes of the network performance degradation to support optimization of the network performance. Particular embodiments of the system enable network optimization (e.g., infrastructure level, application level) based on information from multiple layers of the system (e.g., both infrastructure level and application level) instead of information from one single layer only (e.g., infrastructure level only or application level only), and therefore improve network performance in ways that are not possible before. Particular embodiments of the system may provide more effective optimization recommendations with reduced cost for improving the network performance. Particular embodiments of the system may directly evaluate the effectiveness of the network optimization by evaluating the quality of experience (QoE) of users based on the application data. Particular embodiments of the system may provide competitive perspectives for optimizing network in particular areas based on the application data collected cross the networks of multiple carriers. Particular embodiments of the system may provide faster and more accurate congestion detections for cells at a previously prohibitable large scale, enable more effective optimization of network infrastructure (e.g., upgrading capacity, tuning cellular towers, adding fiber links), and provide better QoE to end users of the networks. Particular embodiments of the system may reduce the operating expense (OPEX) (e.g., via reducing the complaints, tickets, lowering the network optimization cost), reduce the CAPEX (e.g., via most effectively pinpoint out where to add more cells and avoid adding cells in non-needed places), recover or boost the traffic volume which would have been suppressed due to unsatisfied QoE.

Network Optimization System

FIG. 1 illustrates an example system 100 for optimizing network infrastructure based on application data. In particular embodiments, the system 100 may include a number of layers including, for example, a social network platform 110 (e.g., servers, databases), network infrastructure 120 (e.g., fiber networks, cellular towers, cable networks, switches), computing devices 130 (e.g., client devices, computers, smartphones, tablets), operating systems 140 (e.g., iOS 142, android 144), applications 150 (e.g., social network applications 152, third-party applications 154, operators' applications, carriers' applications), users 101, etc. The social network platform 110 may provide content and services to users 101 through the network infrastructure 120 and the computing devices 130. The computing devices 130 may include device hardware 134 (e.g., computers, smartphones, tablets) and may be associated with particular data plans 132 provided by one or more carriers. The computing devices 140 may include an operating system (e.g., iOS 142, android 144) and a number of applications 150 (e.g., social network applications 152, third-party applications 154) running on the computing devices 130. The users 101 may interact with the applications 150 running on the computing devices 130 to access the content and services provided by the social network platform 110. In particular embodiments, the system 100 may collect data (e.g., application names, application types, time duration, quality of experience, network speed, latency, total amount of data delivered, signal strength, number of connected towers, signal stability status, network coverage, etc.) from the applications 150 running on the computing devices 130 used by the users 101. The system 100 may collect the application data through one or more application programming interfaces (APIs) provided by the social network platform 110 or third-parity entities (e.g., network carriers, operating system providers, application developers, application service providers). The system 100 may use the collected application data for monitoring the network performance, such as, detecting network congestion or coverage problems. The system 100 may provide network insights 160 (e.g., congested areas, congest alerts, coverage alerts, network speeds, network latency, network performance, etc.) based on the collected application data for the optimization of network infrastructure 120. The system 100 may also provide feedback information (e.g., improvements on QoE, network speed, latency) for the optimization actions taken on the network infrastructure 120.

In particular embodiments, the system 100 may monitor the communication network performance (e.g., network traffic congestions, network coverage issues) based on the data from both front-end (e.g., user devices 130, applications 150, operating system 140, websites, search engines, etc.) and back-end (e.g., social network platform 110, network infrastructure 120, servers, switches, database, etc.) of the communication network. In particular embodiments, the system 100 may collect user experience data (e.g., network speeds, network latency, signal stability status) from both front-end and back-end of the communication network. In particular embodiments, the system 100 may use the data collected from the front-end (e.g., applications) to generate optimization recommendations for the back-end network infrastructures 120 or/and social network platform 110. In particular embodiments, the system 100 may use the data collected from the back-end (e.g., social network platform 110, network infrastructure 120) to generate optimization recommendations for the front-end user experience (e.g., applications 150, operating system 140, user devices 130, data plan 132, network speeds, latency, etc.). In particular embodiments, the system 100 may determine one or more network performance metrics (e.g., ratios based on average network speeds) and compare the network performance metrics to respective threshold values to detect network congestions in one or more areas covered by the communication network. In particular embodiments, the system 100 may determine one or more network coverage metrics (e.g., signal strength, number of connected towers, signal stability status) and compare the network coverage metrics to respective threshold values to detect the network coverage issues.

Congestion Detection Framework Overview

Figure 2:
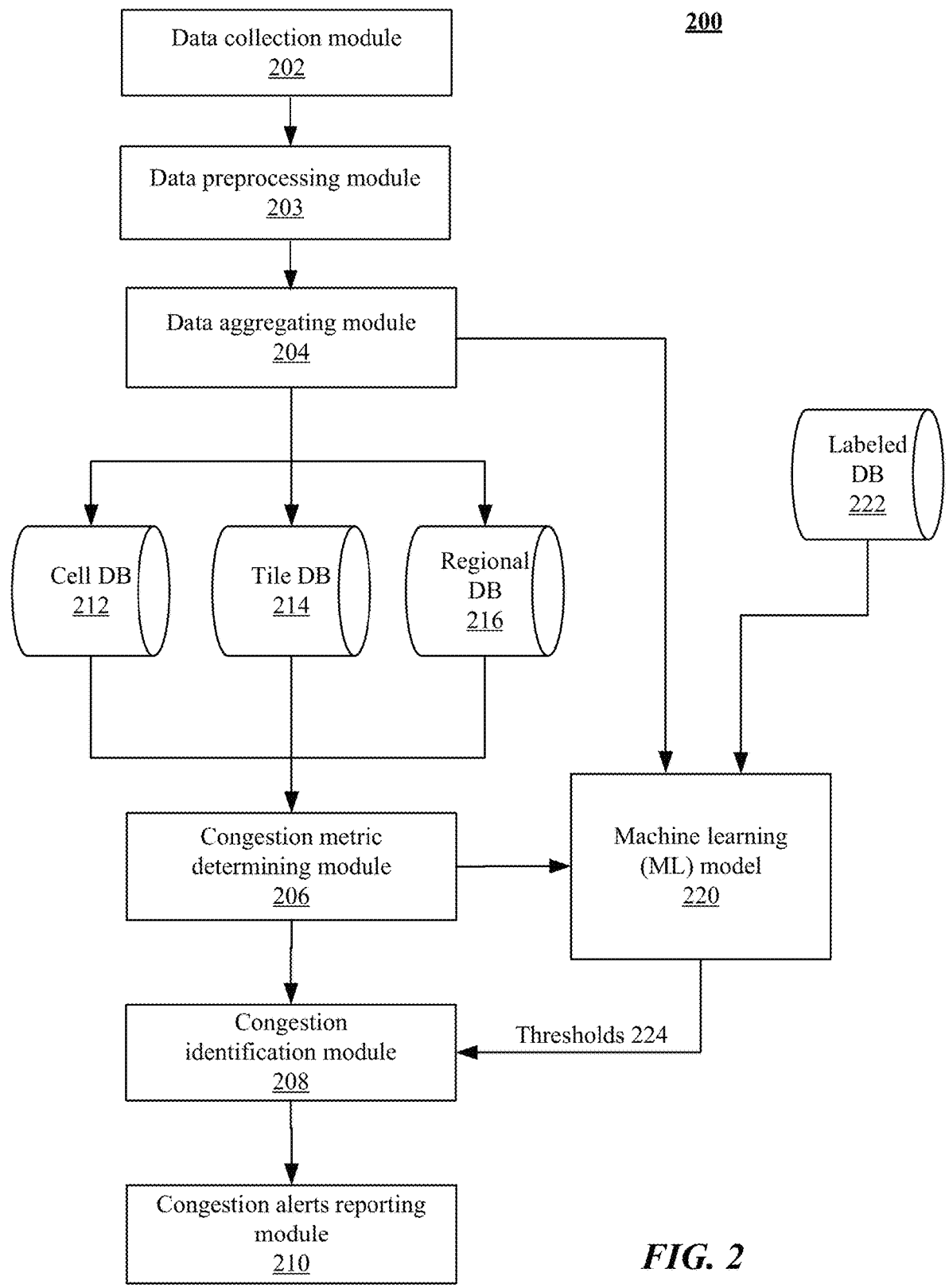
FIG. 2 illustrates an example framework for detecting network congestions.

FIG. 2 illustrates an example framework 200 for detecting network congestions. In particular embodiments, the framework 200 may be implemented on the social network platform 110 (e.g., social network servers) or third-party platforms (e.g., third-parity servers), which may coordinate with the network infrastructure 120 and user devices 130 to collect application data and detect network congestions. In particular embodiments, the framework 200 may include a data collection module 202, a data preprocessing module 203, a data aggregating module 204, a congestion metric determining module 206, a congestion alert identification module 208, a congestion alert reporting module 210, a machine-learning (ML) model 220, a number of databases (e.g., cell databases 212, tile databases 214, regional databases 216, labeled databases 222), etc. In particular embodiments, the data collection module 202 may collect raw application data for a number of computing devices (e.g., via APIs). Then, the collected data may be preprocessed by the data preprocessing module 203 and aggregated by the data aggregating module 204 into particular format (e.g., per hour per each individual day or per hour all days of a number days). The aggregated data may be stored in one or more databases (e.g., cell databases 212, tile databases 214, regional databases 216) or/and be fed to the ML model 220. For example, the data may be aggregated at tile level and each tile may have a side length of L and an area of L×L. In particular embodiments, the data may be aggregated at one or multiple tile levels. If the data is aggregated at cell level, the data may be stored in cell databases. If the data is aggregated at region level or polygon level, the data may be stored in regional databases. The aggregation process could utilize the data from the tile databases, which may include, for example, the mapping of the tiles to region, mapping of the cells to region, mapping of the tiles to cell, and the location (e.g., latitude, longitude) of the application requests. The aggregated data may be labeled manually by experts or automatically by algorithms and the labeled data may be stored in a labeled database 222 which may be used to train the ML model 220. The congestion metric determining module 206 may access the data stored in one or more databases (e.g., cell databases 212, tile databases 214, regional databases 216) and determine one or more network performance metrics based on the accessed data. In particular embodiments, the congestion metrics determining results from the congestion metric determining module 206 may be fed to the ML model 220 for training of the ML model. The congestion identification module 208 may identify one or more congestions in one or more areas of the network based on comparison of the network performance metrics and corresponding thresholds 224. The threshold 224 that are used to determine the congestions may be determined and fed to the congestion identification module 208 by the ML model 220. Then, the congestion alert reporting module 210 may generate congestion alerts and report these alerts to the MNOs. In particular embodiments, the generated congestion alerts may be ranked by one or more network performance metrics. The ranked list of the congestion alerts may be filtered and sent to the MNOs to help the MNOs to prioritize the detected congestions.

Data Collection and Aggregation

Identify High Traffic Cells

In particular embodiments, the system may use data collection module 202 to collect raw application data from the computing devices used by end users. The system may firstly identify a number of high traffic areas (e.g., cells, tiles, regions) in the network for further congestion detection in those areas. The high traffic areas may be identified based on a determination that one or more traffic metrics (e.g., traffic volume, total number of samples or total number of requests) in these areas are above corresponding pre-determined thresholds or above average traffic metric values of one or more other areas. In particular embodiments, the system may rank the areas of the network by one or more traffic metrics and identify the top M number of areas as the high traffic areas of the network. For example, the system may rank the cells of a cellular network by the number of requests of each cell and take the top M number of cells as the high traffic cells for further network congestion detection.

Data Collection

In particular embodiments, the system may collect raw application data (e.g., via APIs) in the identified high traffic areas (e.g., cells, tiles, regions) of the network. The data collected by the system may include information about, for example, how people are using the applications, how much time they spend using the applications, what are application names and types, how often the users come back to the applications, what is quality of experience (e.g., network speed, latency, network coverage), etc. In particular embodiments, the data collected by the system may include location-based network performance data, for example, network performance in particular areas of interest. The network performance data may include data representative of the network performance at the application level (e.g. traffic volume or demand volume or network speeds or network capacity, i.e. bandwidth), e.g. the network performance as experienced by the computing device, while executing an application. The data collected by the system may include competitor network performance, for example, network performance data of other carriers in the areas of interest. The raw application data may be logged based on requests from applications together with the time stamp associated which each application request. The collected data may include the cell identifications of serving cells that the user devices are connected, location information of user devices (e.g., via APIs when user approves and enables location-based services of the devices), carrier information (e.g., network providers), etc. The cell identification of each cell may be unique by containing concatenated information such as air interface technology type information. The collected data may include the counters related to the total bits of information delivered and the time spent for delivery of that information. The collected data may be used to determine one or more network performance metrics. For example, the counters of the total bits of the information delivered and the corresponding time spent for delivery of that information may be used to determine the download speed of the network.

In particular embodiments, the user devices may communicate with the social network platform through internet connections. The user devices may send communication request to and receive data from the social network platform back and force. In particular embodiments, the system may sample the requests with a particular sampling rate (e.g., one in one hundred). The system may record a number of matrix, which may include information about the number of devices that are connected, the number of requests from user devices, the time required for the requests to be received by the social network platform, the amount of data transmitted by the social network platform to the user devices, the time spent in transmitting that data to the user devices, etc. The system may determine, based on the collected data, a number of network parameters including, for example, the speed of connection (e.g., dividing the total bits processed by the time spent), the cells (e.g., cell identifications) that the devices are connected to, information of carriers, time, locations, types of devices, application versions, etc. The data may be continuously collected at the applications and may be periodically (e.g., daily or every several days) sent back to the social network platform for storage. The system may store the collected information in a database on which the system may run an information processing pipeline for detecting network congestions.

Data Aggregation

In particular embodiments, the system may use the data preprocessing module 203 to preprocess the collected raw data for data cleaning. Then, the system may use the data aggregating module 204 for data aggregating. The system may first filter and clean the collected data and then, may aggregate the data at different levels. For example, the system may aggregate the data by cells, tiles (e.g., squares describing geographic areas with different resolutions), or regions (e.g., zip-code regions, counties, provinces, states). After the data aggregation, the system may visualize the data set and use the aggregated data as inputs for network modelling. In particular embodiments, the system may store the aggregated data in different data bases. For example, the system may store the data aggregated by cells in the cell database 212. As another example, the system may store the data associated to or/and aggregated by tiles or locations in the tile database 214. The information associated with tiles may include, for example, identifications of cells related to the tiles, identifications of the tiles, tile sizes, identifications of carriers, metadata, network performance data, etc. As another example, the system may store the data associated to or/and aggregated by regions in the regional database 216. The data associated to the regions may include polygons representing regions, polygon identifications, collections of polygons, customized shapes representing regions, etc. A polygon in the regional database 216 may represent a region of any size, for example, a zip-code area, a settlement, a county, a town, a city, a state, a country, etc. The system may (e.g., through the data aggregating module 204 or congestion metric determining module 206) may access to all databases in including the cell database 212, the tile database 214, or/and the regional database 216 for determining the network performance for network congestion detection. Each database may be mapped to any other databases by the system. In particular embodiments, the system may aggregate the collected data periodically (e.g., every week or every several weeks). In particular embodiments, the system may collect, preprocess, and aggregate data in real time.

In particular embodiments, data aggregation may be performed for all application data related to all the devices associated with a particular cell. In particular embodiments, the data aggregation may be performed on the temporal dimension. As an example, the aggregated data can be per hour per each individual day. As another example, the aggregated data can be per hour all days of a duration of a number of days. The number of samples may be calculated for each unit of data of the aggregated data, for example, for data of every hour for each individual day, or data of every hour for a duration of N days (e.g., 7 days, 28 days). Alternatively, the system may calculate the total amount of bits delivered based on data aggregated for each hour each individual day, or each hour all N days. The system may use the number of samples or/and the total amount of delivered bits as indication of the demand volume and traffic volume of the communication network.

Computation Efficiency

In particular embodiments, the system may process huge amount of data collected from large scale communication networks. The system may calculate the network performance metric based on data points per hour per individual day. Depending on the data amount and number of samples, the computation based on data points per hour per individual day may require long computation time and large amount of computational resources. To improve the computation efficiency and reduce the computing time, the system may use the data points per hour all days of interest instead of per hour per individual day to calculate the network performance metrics. For congestion modelling at cell level, the network performance metric based on data points per hour all days can effectively enable the identification of the network congestion for a cell and has the advantages of computing simplicity for large scale networks. For time series analysis, the system needs to understand certain spike of the communication demand in a particular time window. The system may identify the cells that need time series analysis and perform the time series analysis for those cells based on data points per hour per individual day (because it includes more information in time domain).

Variations of Approaches

In particular embodiments, the system may perform congestion detections separately for weekdays, weekends, or holidays. In particular embodiments, the system may generate a congestion detection model based all the data collected during weekdays, weekends, or/and holidays. In other embodiments, the system may generate separate models based on data collected during weekdays, weekends, or holidays, respectively. The system may filter the data and exclude cells with small number of data samples (which represents low demand). For example, the system may exclude cells with the lowest 20 percentiles of the number of samples. This can reduce the computation and increase efficiency for congestion detection.

In particular embodiments, the system may remove an aggregated hourly data point if the number of the samples, from which this data point is aggregated, is below certain threshold. For example, for a particular hour near 3 AM of an individual day, the aggregated data point may correspond to a number of samples of 2. In other words, only 2 data samples (i.e., 2 requests) are logged during this particular hour. The system may determine that the number of sample is lower than a threshold (e.g., 5) for this particular hour of this particular day and may remove this aggregated data point from the further process of congestion metric derivation. As another example, if a particular hour near 3 AM aggregated from N days, the aggregated data point may correspond to a number of samples of 25. In other words, only 25 data samples (i.e., 25 requests) are logged during this particular hour of N days. The system may determine that this number of samples 25 is lower than a threshold (e.g., 30), and may remove this aggregated data point from the further process of congestion metric derivation.

In particular embodiments, the system may exclude cells which have data available only from limited number of hours (e.g., busy hours, non-busy hours, total number of busy hours and non-busy hours, or total number of hours). If the number hours of the available data is below certain threshold for a cell, the system may exclude this cell from further processes for congestion detection. For example, if none of the hourly data points is removed (as described in former sections), the system may have 24 hours data points if the aggregated data is per hour all N days. If some hourly data points are removed, due to small number of samples used in aggregation, the system may have less than 24 data points (e.g., 10 data points) after removing those hours with small number of samples used in aggregation. The system may determine that the number of remaining data points (e.g., 10 data points) is lower than a threshold (e.g., 20 data points) and the system may exclude this cell from further processes of congestion detection.

In particular embodiments, the system may determine a confidence level score for the derivation of download speed when there are small numbers of samples. The confidence score may indicate the level of confidence on the estimation of the download speed. If the confidence is lower than a threshold, the system may exclude this cell from further processes of congestion detection. In particular embodiments, the system may use binning or average over the data points per given number samples to detect network congestion instead of using per hour per cell data points.

Congestion Metric

Model A: Ratio Based on Busy Versus Non-Busy Hour Network Speeds

Figure 3C:
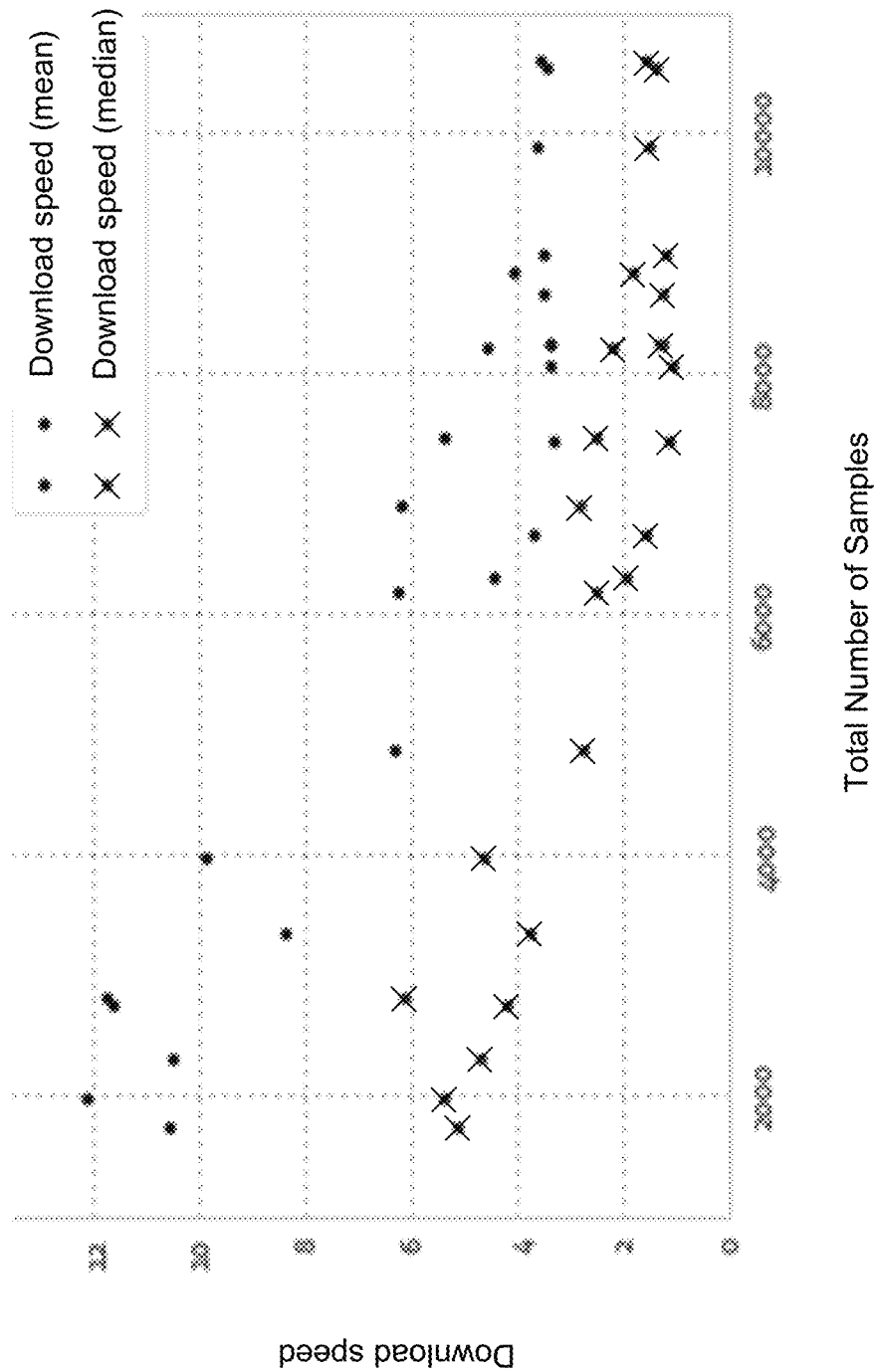

FIGS. 3A-C illustrate example data related to network download speed and total number of samples associated with a cell having network congestions. As illustrated in FIGS. 3A-B, the network speed and the total number of samples may be correlated and may vary over time. In general, a lower network speed may be correlated to a larger number of samples. As illustrated in FIG. 3B, the time windows that include a larger number of samples, which may indicate high demands for network connectivity, may be corresponding to relative busy hours. The time windows, that include a smaller number of samples, may be corresponding to relative non-busy hours. The busy and non-busy hours may be determined based on the total number of samples over time. FIG. 3C illustrates the correlation between the network download speed and the total number of samples of this particular cell. In FIG. 3C, both the mean and median average download speeds are degraded when the total number of samples increases, and the download speed degradation may be used as a sign that the cell is likely to have network congestion.

In particular embodiments, the system may determine one or more network congestion metrics for detecting network congestions based on network speeds of busy and non-busy hours. The congestion metrics may indicate the degree of degradation of the network performance (e.g., network speeds) when one or more conditions change (e.g., total number of samples increasing). As an example and not by way of limitation, the system may first identify busy hours and non-busy hours for each individual cell. The busy hours could be the hours during which the communication network has the high traffic volume or demand volume. For example, the busy hours could be a certain percentile of the hours corresponding to the highest number of samples, or highest amount of information bits delivered. The percentile of the busy hours could be fixed or could vary depending on configuration. The non-busy hours, similarly, could be the hours during which the communication network has the low traffic volume or demand volume. For example, the non-busy hours could be a certain percentile of the hours corresponding to the lowest number of samples or lowest amount of information bits delivered. The percentile for non-busy hours may be fixed or may vary depending on configuration. In particular embodiments, the busy hours and non-busy hours may be determined by comparing the number of samples or network traffic volume to one or more threshold values. The threshold values may be fixed or may vary depending on configuration. In particular embodiments, the busy hours and non-busy hours may be determined by a machine-learning (ML) model which is trained by historical data.

In particular embodiments, after busy hours and non-busy hours are determined, the system may determine the network congestion metrics based on data of the busy and non-busy hours. For example, the network congestion metric may be a ratio as described in the following equation (Equation 1):

$$\text{ratio} = \frac{S_{busy\ hours} - S_{non\text{-}busy\ hours}}{S_{non\text{-}busy\ hours}} \quad (1)$$

where, $S_{busy\ hours}$ is average download speed at busy hours, $S_{non\text{-}busy\ hours}$ is average download speed at non-busy hours. Alternatively, the network congestion metric can be a ratio as described in the following equation (Equation 2), which is a negative of Equation 1. Note that Equation 1 could lead to a negative ratio value for the cell which is congested, while Equation 2 could lead to a positive ratio value for the cell which is congested.

$$\text{ratio} = -\frac{S_{busy\ hours} - S_{non\text{-}busy\ hours}}{S_{non\text{-}busy\ hours}} \quad (2)$$

In particular embodiments, the system may use the average download speed at busy hours as the denominator in Equations 1 or 2.

Model B: Ratio Based on Reference Points

In particular embodiments, the system may determine the network congestion metric for each individual cell based on reference points on a network speed curve (e.g., download speed vs. traffic volume or number of samples), as described in the following equations:

$$\text{ratio} = \frac{S_{reference\ Point\ A} - S_{reference\ point\ B}}{S_{reference\ point\ A}} \quad (3)$$

$$\text{ratio} = -\frac{S_{reference\ Point\ A} - S_{reference\ point\ B}}{S_{reference\ point\ A}} \quad (4)$$

where, $S_{reference\ Point\ A}$ is download speed at reference point A and $S_{reference\ Point\ B}$ is download speed at reference point B. The reference point A may be a reference point representing an average or median of the download speed for the relatively flat portion of the download speed curve (e.g., download speed vs. traffic volume or number of samples). For example, the relative flat portion of the download speed curve may be the curve portion that does not yet bend down for the download speed degradation over the traffic volume or the number of samples. In particular embodiments, the reference point may be in the non-busy hours. In particular embodiments, the reference point A may be not in the non-busy hours, rather, in some cases, it may have even higher download speed if the non-busy hours are already at the bent-down part of the download speed curve over the traffic volume. Such reference point A could be identified using the hourly data per individual day. Reference point B could be within busy hours or could be in the portion of the curve corresponding to the higher end of the traffic volume. In particular embodiments, the system may use the download speed at reference point B as the denominator in Equations 3 and 4.

Average Speeds

In particular embodiments, the average download speed at busy hours (as used in Equations 1 and 2) could be mean, median (i.e., percentile-50 or p50), or mode of the download speed of the busy hours. The download speed of the busy hours may be based on aggregated per hour all days download speed. The aggregated per hour all days download speed could also be mean, median, or mode of all the download speed samples. There are many combinations that could be used for determining the average download speed of the busy hours. Some examples of the possible combinations are described as following:

TABLE 1

| Average Speed | Description |
| --- | --- |
| Mean_Median | Take mean of all the samples of the download speed, then take median of the download speed of busy hours |
| Mean_Mean | Take mean of all the samples of the download speed, then take mean of the download speed of busy hours |
| Median_Median | Take median of all the samples of the download speed, then take median of the download speed of busy hours |
| Median_Mean | Take median of all the samples of the download speed, then take mean of the download speeds of busy hours |

Similarly, the average download speed for non-busy hours may also be determined based on many combinations similar to that as described above.

Figure 4:
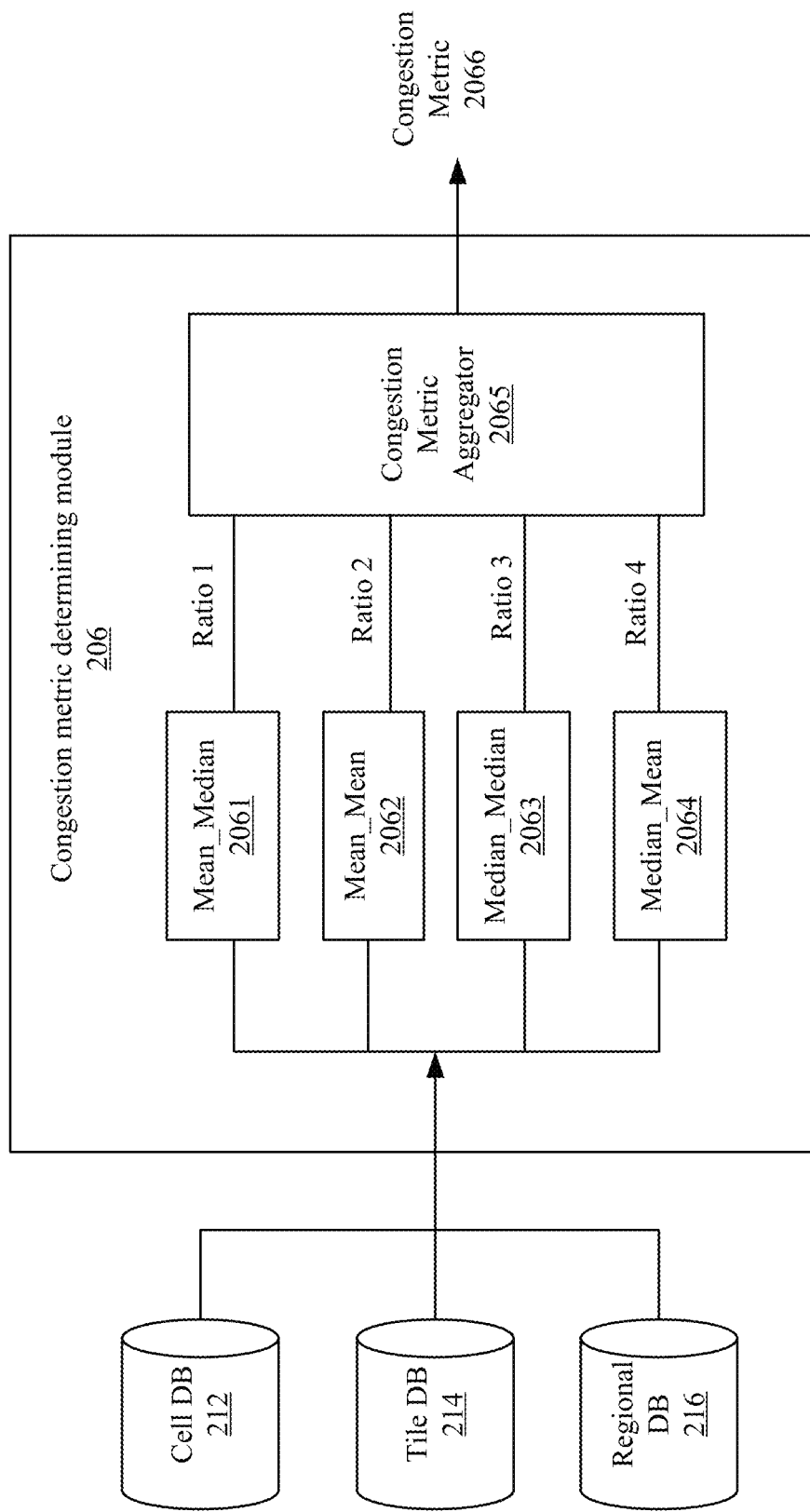
FIG. 4 illustrates an example congestion metric determining module which determines congestion metrics based on different average network speeds.

FIG. 4 illustrates an example congestion metric determining module 206 which determines congestion metrics based on different average network speeds. The congestion metric determining module 206 may access the databases (e.g., the cell database 212, the tile database 214, the regional database 216) and calculate multiple ratios based on the possible combinations of different average network speeds. For example, for each of the four combinations (e.g., mean_median 2061, mean_mean 2062, median_median 2063, median_mean 2064) as listed in Table 1, the congestion metric determining module 206 may calculate four ratios including ratio_1, ratio_2, ratio_3, and ratio_4. For each of these ratios, either Equation 1 or 2 may be used for the calculation. Then, the congestion metric determining module 206 may use the congestion metric aggregator 2065 to determine the congestion metric 2066 based on an average or weighted average of one or more of the calculated ratios (e.g., ratio_1, ratio_2, ratio_3, ratio_4). For example, the congestion metric aggregator 2065 may use the average of these four ratios to determine a more robust congestion metric 2066, as described in the following equation:

Congestion Metric=average(ratio_1,ratio_2,ratio_3, ratio_4) (5)

Alternatively, the congestion metric aggregator 2065 may determine the congestion metric 2066 based on any number of ratios of the four ratios. For example, the congestion metric aggregator 2065 may use an average of two ratios to determine the congestion metric as following:

Congestion Metric=average(ratio_3,ratio_4) (6)

As another example, the congestion metric could be weighted sum of these four ratios, and if the weight is zero for a certain ratio, then that ratio is not included in the congestion metric.

In particular embodiments, the system may determine the congestion metric based on average of multiple ratios (e.g., ratio_3, ratio_4) using Equations 2 and 6. The multiple ratios (e.g., ratio_3, ratio_4) may be calculated using the different type of average download speeds for busy hours and non-busy hours. For example, the average speed of busy hours for the first ratio (e.g., ratio_3) may be calculated based on median speeds of busy hours which are determined based on median speeds of all samples of the download speed. The average speed of the non-busy hours for the first ratio (e.g., ratio_3) may be calculated based on median speeds of non-busy hours which are determined based on median speeds of all samples of the download speed. As another example, the average speed of busy hours for the second ratio (e.g., ratio_4) may be calculated based on mean speeds of busy hours which are determined based on median speeds of all samples of the download speed. The average speed of non-busy hours for the second ratio (e.g., ratio_4) may be calculated based on mean speeds of non-busy hours which are determined based on median speeds of all samples of the download speed. The system may compare the congestion metric (e.g., average ratio determined by Equation 6) to a threshold (e.g., 0.18) and detect network congestion when the average ratio is above or equal to the threshold.

In particular embodiments, the system may include a network performance metric database. The network performance metric database may be associated with the cell database, the tile database, and the regional database (polygon database). The system may allow users of the system to query the database to obtain the corresponding network performance metrics. In particular embodiments, the regional congestion metric could be also derived in alternative ways, for example, from the tile-level congestion metric, or from the cell-level congestion metric, instead of directly from all the samples within the region. For example, the regional congestion metric can be a median or an average of all the congestion metrics of all the cells within this region, or a median or an average of all the congestion metrics of all the tiles within this region. In this disclosure, congestion metric may be interchangeable to congestion indicator.

Congestion Detection

Congestion Detection Rules

In particular embodiments, the system may (e.g., using the congestion identification module) compare the network performance metric (e.g., congestion metric) to a threshold value to detect network congestion based on a number rules. For example, if the system detects, for a particular cell, the congestion metric determined by Equation 1 is below or equal to a first threshold (e.g., −18%, i.e., −0.18), the system may determine that the cell includes a network congestion and may send an alert to the operator. As another example, the system may determine, for a particular cell, that the congestion metric determined by Equation 2 is above or equal to a second threshold (e.g., 18%, i.e., 0.18), the system may mark the cell as having a congestion and send an alert to inform the operator. In particular embodiments, the threshold values that are used to determine network congestions may be positive or negative values depending on the network performance metrics determined by different equations. In particular embodiments, the threshold value that are used to determine network congestions may be a maximum threshold value or a minimum threshold value depending on the network performance metrics.

Threshold Determination by Machine-Learning Model

In particular embodiments, the system may detect network congestion based on a number of rules and one or more thresholds for the network performance metric. The thresholds may be determined by binary classification such as a congestion-analysis machine-learning (ML) model trained by pre-labeled network congestion data. The pre-labeled network congestion data may include information whether there are congestions in the cells of the network. The data can be manually labeled by engineers in the fields or engineers who are manually monitoring or observing the cells (to see whether the cells have congestions or not). The ML model may use supervised learning to learn to how to determine congestion metric thresholds. The ML model may be trained by network congestion metrics or other metrics derived from the aggregated data. The ML model may determine the congestion metric thresholds based on the supervised learning from the pre-labeled data. The ML model may use classification methods (e.g., decision trees) to generate the congestion metric thresholds or conditions for categorizing network traffic status into multiple categories (e.g., congested and non-congested categories). In particular embodiments, the ML model may generate conditions (e.g., multiple thresholds) which can classify network traffic status to more than two categories and each category may have different levels of congestion severity.

In particular embodiments, the ML model may use classification tree from scikit-learn package. For example, the manually labeled cell data may include at least 400 cells in total (e.g., 315 cells labeled as congested, 85 cells labeled as not congested). For the top cells that have the heaviest total traffic per day, more congestions may be expected to be identified among these cells. The system may be trained based on the top 100 cells with an initial threshold of the ratio which is less than −0.185, which may be adjusted later by the ML model to balance precision and recall rate. In general, the ML model may have more accurate threshold when trained by more manually labeled cell data. In particular embodiments, the ML model may use a single feature for ranking purpose and robustness and use binary classification to determine the threshold. The ML model may provide more flexibility for quickly determining the threshold and for extending for more complicated features or multiple features. In particular embodiments, the threshold may also be adjusted manually. In particular embodiments, the system may use the threshold of −18% for the network congestion alerts, which is relatively aggressively recommending improvements for cells due to congestion alerts.

Alert and Report

Alerts Filtered for Prioritization

In particular embodiments, upon detection of network congestions, the system may send one or more congestion alerts to the MNOs reporting the detected network congestions and the related cells having these congestions. The alerts may include all the cells having congestions or only a part of cells having congestions (e.g., the cells with the most severe congestions). The system may rank the cells based on their congestion severity as indicated by the network performance metrics and send a ranked list of the cells to the MNOs. Alternatively, the selection of the cells to be reported can be based on geographic region, radio access network technology information (e.g., 2G, 3G, 4G, etc.), carriers, network speeds, number of samples, etc. For example, the system may select a certain number of cells with the most severe congestions, or certain percentile of the cells for each operator, each network generation, or each geographic region, or each country, etc. In particular embodiments, the system may use multiple thresholds to filter the detected congestions. For example, the system may have a first threshold of congestion metric (e.g., worst 6 percent) per operator, per country, per network generation and a second threshold of congestion metric (e.g., worst 5 percent) per operator, per region, per network generation. These two thresholds may be different and may be applied on top of each other. For example, the system may apply two filters based on the two thresholds respectively. The MNOs may have many network metrics associated with a large number of cells (e.g., 100 k) to track and consider for optimizing network performance. The large number of metrics could make it very difficult for the MNOs to make optimal decisions. In particular embodiments, the system may generate network models based on the collected application data and use the models to help the MNOs to make better decisions. In particular embodiments, the system may filter the generated congestion alerts to generate an end list to help the MNOs to prioritize the congestion alerts. The congestion alerts may be filtered by usage cases (e.g., video streaming, sharing content, messaging, reading news feeds, gaming, etc.), congested cells, cells with coverage issues, problem devices, costs to fix, etc. In particular embodiments, the ML model may be used for smart filtering to decide which cells should be prioritized for fixing or optimization. In particular embodiments, the filtering methods described herein may be applied to other metrics different from the congestion metric. For example, for cell coverage alerts, the system may filter out the cells with signal strength among the worst 5 percent per region, per network generation, per operator, and generate alerts based on these cells. As another example, the system may filter out the cells and generate alerts based on the following conditions: (1) the cell's signal strength is among the worst 5 percent per region, per network generation, per operator, or (2) the cell's signal strength among the worst 6 percent per country, per network generation, per operator. The cell's signal strength can be defined based on the median or 50-percentile value of all the signal strength samples within the corresponding cells, where the data may be collected at the social network application level.

In particular embodiments, the system may take into consideration the occurrence rate (e.g., per weekly basis) of the alerts in a certain period of time from temporal perspective when filtering the alerts. For example, among all the latest N weeks, if there are M alerts happening, the occurrence rate of the alert can be determined by M/N. The system may define a filter based on the occurrence rate of the alerts and a threshold, such as, the occurrence ratio of the alert being above a threshold value (e.g., 0.3, 0.5, etc.).

In particular embodiments, a score may be calculated for an alerted cell based on the difference of the metric of the alerted cell, comparing to a metric average (e.g., regional average, country average, etc.). For example, the score may be calculated using the following equation:

$$\text{Score} = (\text{Metric of the alerted cell} - \text{Average metric})/\text{Average metric} \quad (7)$$

where the metric of the alerted cell can be signal strength, congestion indicator, etc., and the average metric may be a regional average, country average, etc. In particular embodiments, the system may determine an importance related weight for an alerted cell based on the total number of samples in a certain period of time (e.g., the recent week or latest N weeks). If a cell has a larger number of samples, the cell may have a greater weight, and the weight value may depend on the total number of samples. In particular embodiments, the system may filter alerts based on the importance related scores, and/or weighted scores, and the weight may indicate the total number of samples in the alerted cell. Although the filtering above is described in the context of congestion alerts, the filtering may be applicable to other suitable types of alerts.

User Interfaces

Figure 5A:
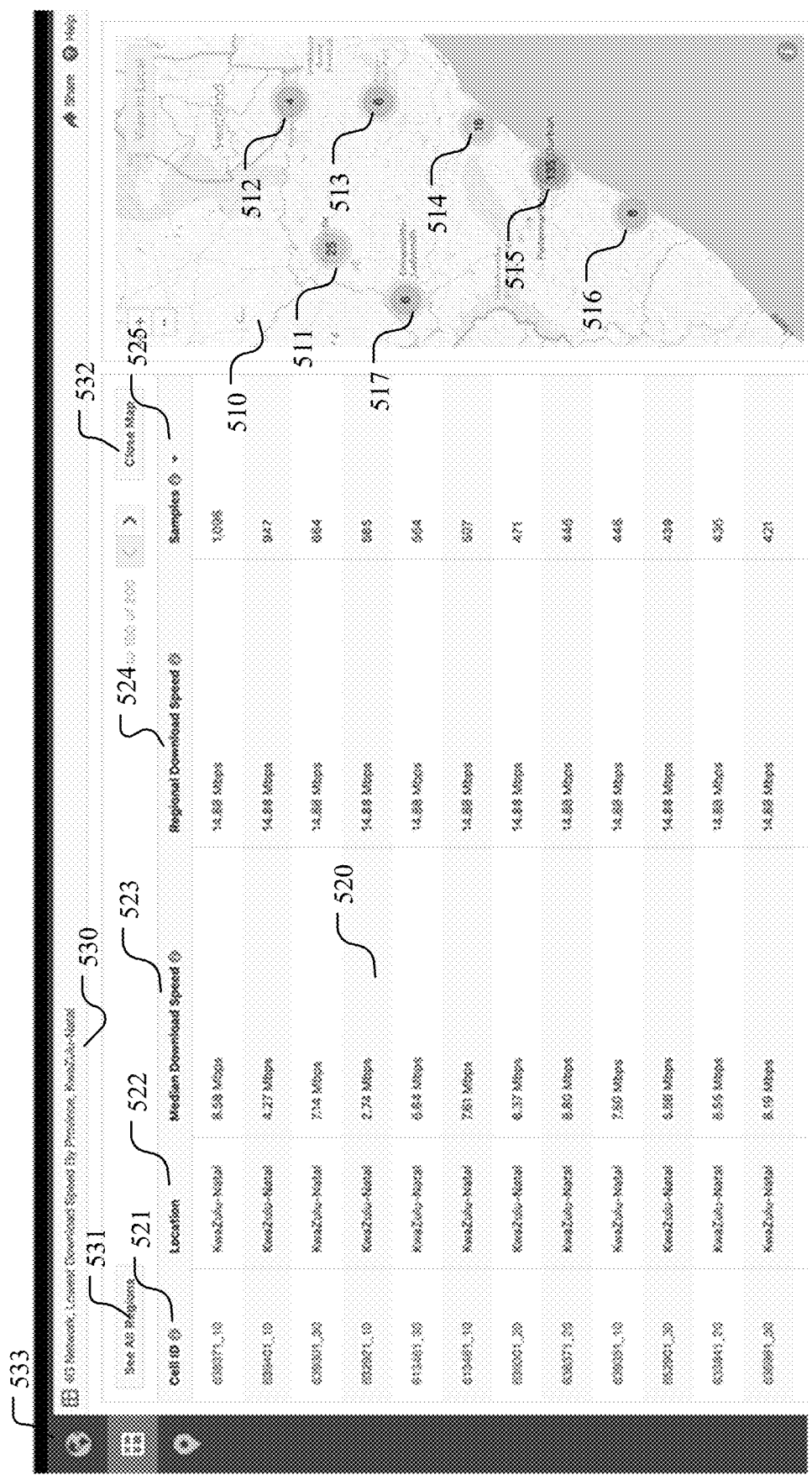
FIGS. 5A-F illustrate user interfaces of the system for detecting network congestions and reporting the congestion alerts.

FIGS. 5A-F illustrate user interfaces of the system for detecting network congestions and reporting the congestion alerts. As illustrated in FIG. 5A, the user interface 500A of the system may include a map 510 showing the areas that have network congestions (e.g., 511, 512, 513, 514, 515, 516, 517). Each area that has network congestion may be indicated by a circular indicator and a number within the circular indicator. Each area may be associated one or more cells. Each cell may include one or more cell towers and each cell tower may include one or more cell sectors. In particular embodiments, the number in the circular indicators may indicate the number of detected congestion alerts in the associated area. In particular embodiments, the circular indicator may be displayed with different colors to indicate the severity of the network congestions. The user interface 500A may further include a table 520 showing a list of cell alerts indicating the cells with network congestions or cells with different network speeds. Each row of the table 520 may include a cell alert and each column of the table 520 may be corresponding to a supporting attribute associated with the cell alert (e.g., cell identification 521, location 522, median download speed 523, regional download speed 524, number of samples or requests 525, etc.). The user interface 500A may further include a header section 530 indicating the current query (e.g., 4G network, lowest download speed by Province, KawaZulu-Natal) and a number buttons (e.g., 531, 532, 533). The button 531 may be used for specifying the regions that will be displayed in the user interface 500A. The button 532 may be used for closing the map 510. The buttons 533 may be used to switch between different display modes (e.g., table view, map view, location view). The list of cell alerts in the table 520 may be ranked by one or more of the associated attributes. For example, the list of cell alerts in 500A may ranked by the number of samples from the highest to lowest. In particular embodiments, the list of cell alerts may be ranked by other attributes, such as, cell identifications 521, locations 522, median download speeds 523, regional download speed 525, congestion indicators 590 (shown in FIGS. 5D-F), regional congestion indicators 591 (shown in FIGS. 5D-F), etc. When the user of the system selects a particular cell alert, the user interface 500A may display further detailed information about the cell (e.g., from the cell database) and other information associated with the cell alert.

Figure 5B:
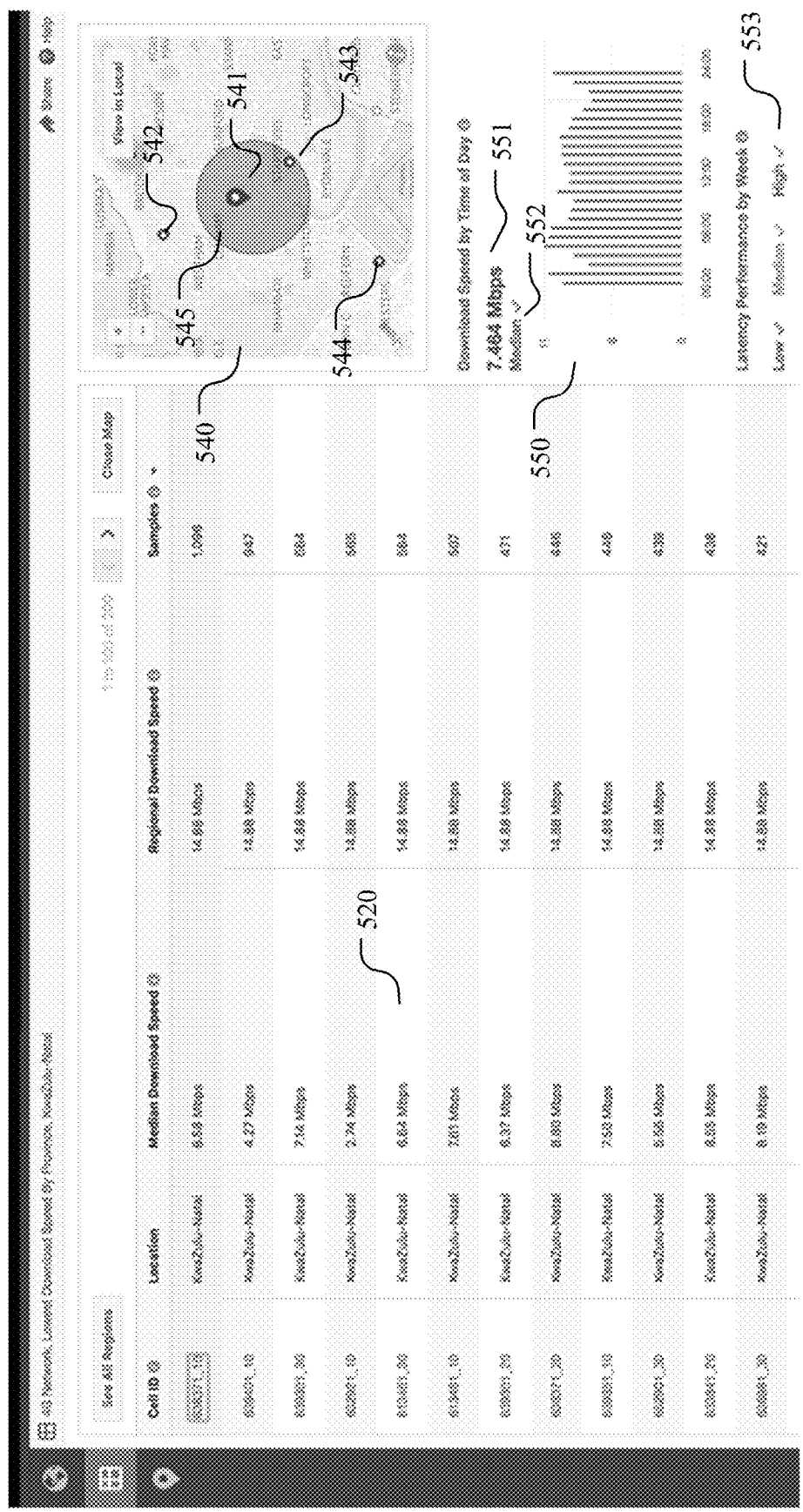

As illustrated in FIG. 5B, the user interface 500B may include the table 520, a map 540, and a chart 550. Similar to user interface 500A, the table 520 may be used to display a list of cell alerts for network congestions. The map 540 may display a number of locations (e.g., 541, 542, 543, 544) associated with network congestion alerts. The user interface 500B may allow users to define an area of interest 545 in the map 540 and display the associated information (e.g., download speed by time of day) in a separate chart 550. The user interface 500B may be configured through an interactive drop-down menu 552 to display network performance information, for example, the median download speed 551 (e.g., 7.464 Mbps). The chart 550 may display the network download speed in a bar chart over time of day. In particular embodiments, the user interface 500B may allow the user to specify other information 553, for example, latency performance by week as categorized by low, median, high performance, to be display in other charts (not shown).

Figure 5C:
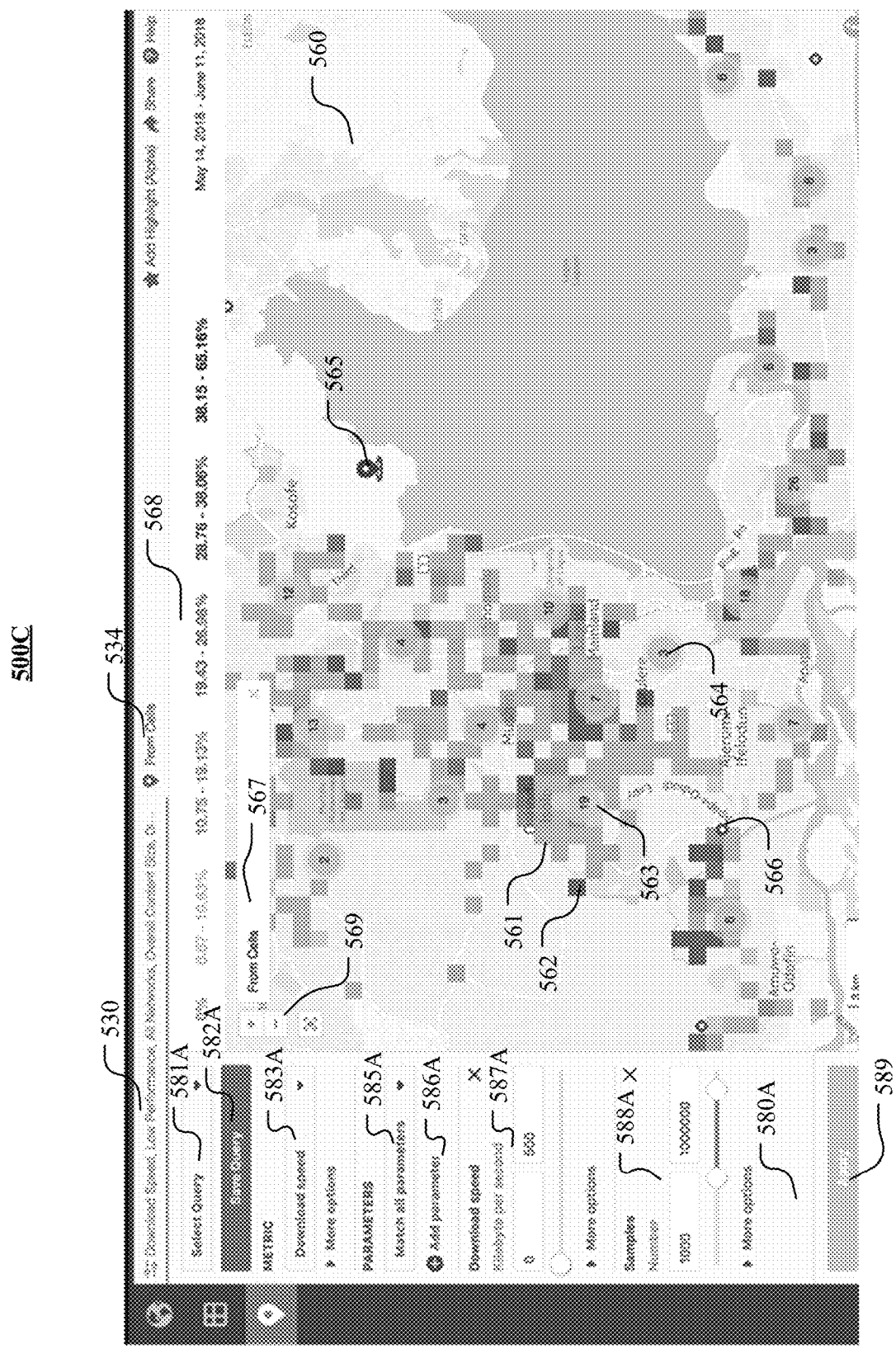

As illustrated in FIG. 5C, the user interface 500C may include a map 560 displaying a number map tiles (e.g., 561, 562), a number of congested areas (e.g., 563, 564), a number of locations of interest (e.g., 565, 566), etc. In particular embodiments, map tiles may be displayed in different colors to indicate the status of the network performance in each map tile. The congested areas may be indicated by circular indictors each with a number inside indicting the number of congestion alerts or the number of congested cellular towers. The map may be used to analyze the network performance associated one or more locations of interests (e.g., 565, 566). The user interface 500C may further include a header section 568 displaying the percentile of congestion of different colors associated with map tiles (e.g., 561, 562). The user interface 500C further include a search bar 567 which may receive query keywords to search in the map 560. The map 560 may further include a number buttons 569 to allow users to navigate or zoom in or out the map 560. In particular embodiments, the user interface 500C may include configuring panel 580A allowing users to input or configure the query for the system. For example, the users of the system may select a query from a number of pre-defined or pre-stored queries via the drop-down menu 581A to query the system. The users of the system may save the current query using the button 582A. The users of the system may input or configure the queries by setting download speed thresholds through the drop-down menu 583A, setting matching parameters through the drop-down menu 585A, adding new parameters through button 586A, setting download speed ranges by inputting number or scrolling the control bar of the control element group 587A, setting the ranges of the number samples by inputting number or scrolling the control bar of the control element group 588A, or/and applying the configuration to the query through the button 589A. The circular indictors each with a number inside may use the number to indicate the number of alerts which are not limited to congestion alerts. For example, the number may indicate the number of coverage alerts or the number of cells with coverage alerts. As another example, the number may indicate the number of cells with low download speed alerts. In particular embodiments, each type of alert could be displayed on an individual page. In particular embodiments, if there are composite alerts associated with multiple metrics, the multiple types of alerts could be shown on the same page.

Figure 5D:
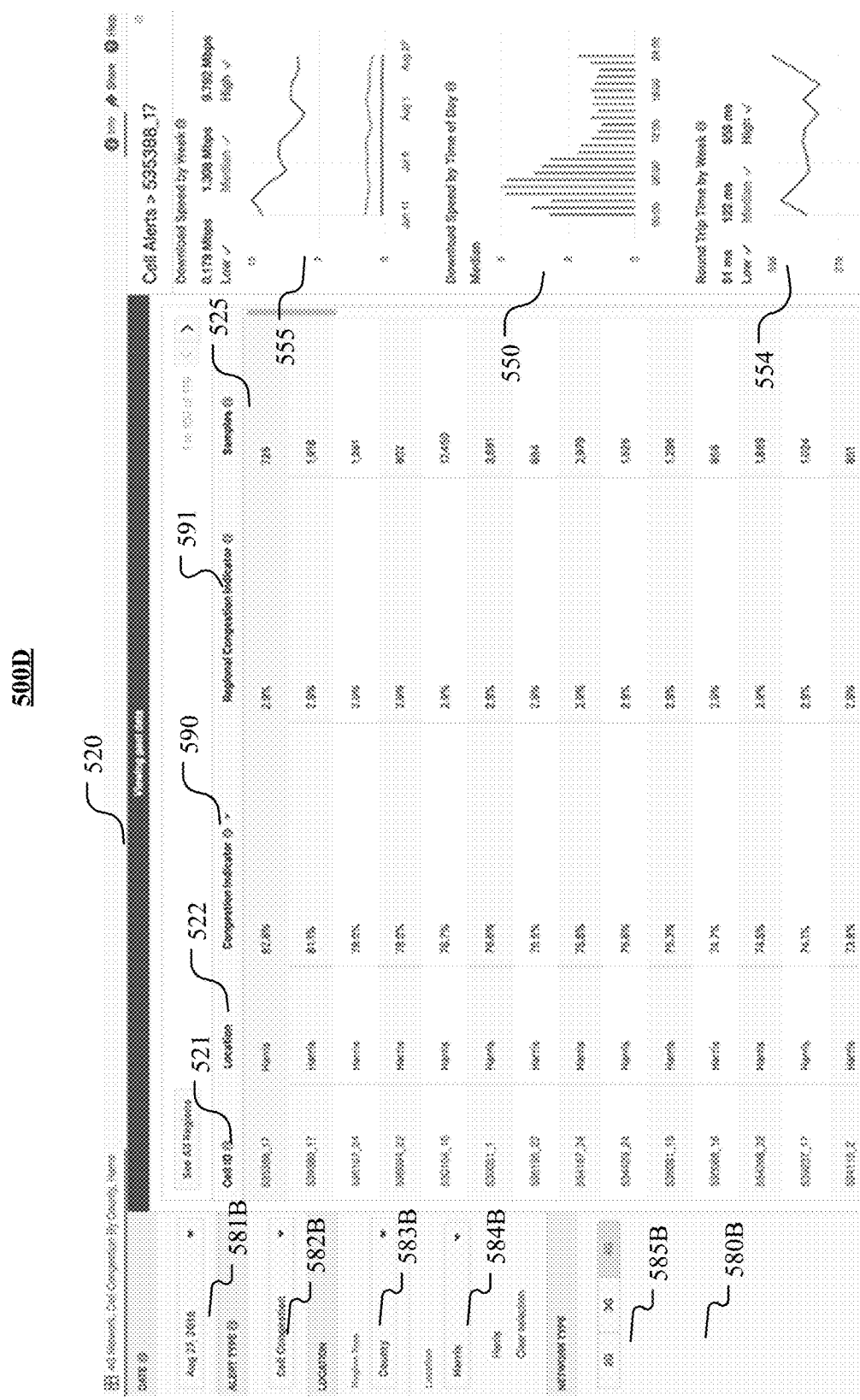
Figure 5E:
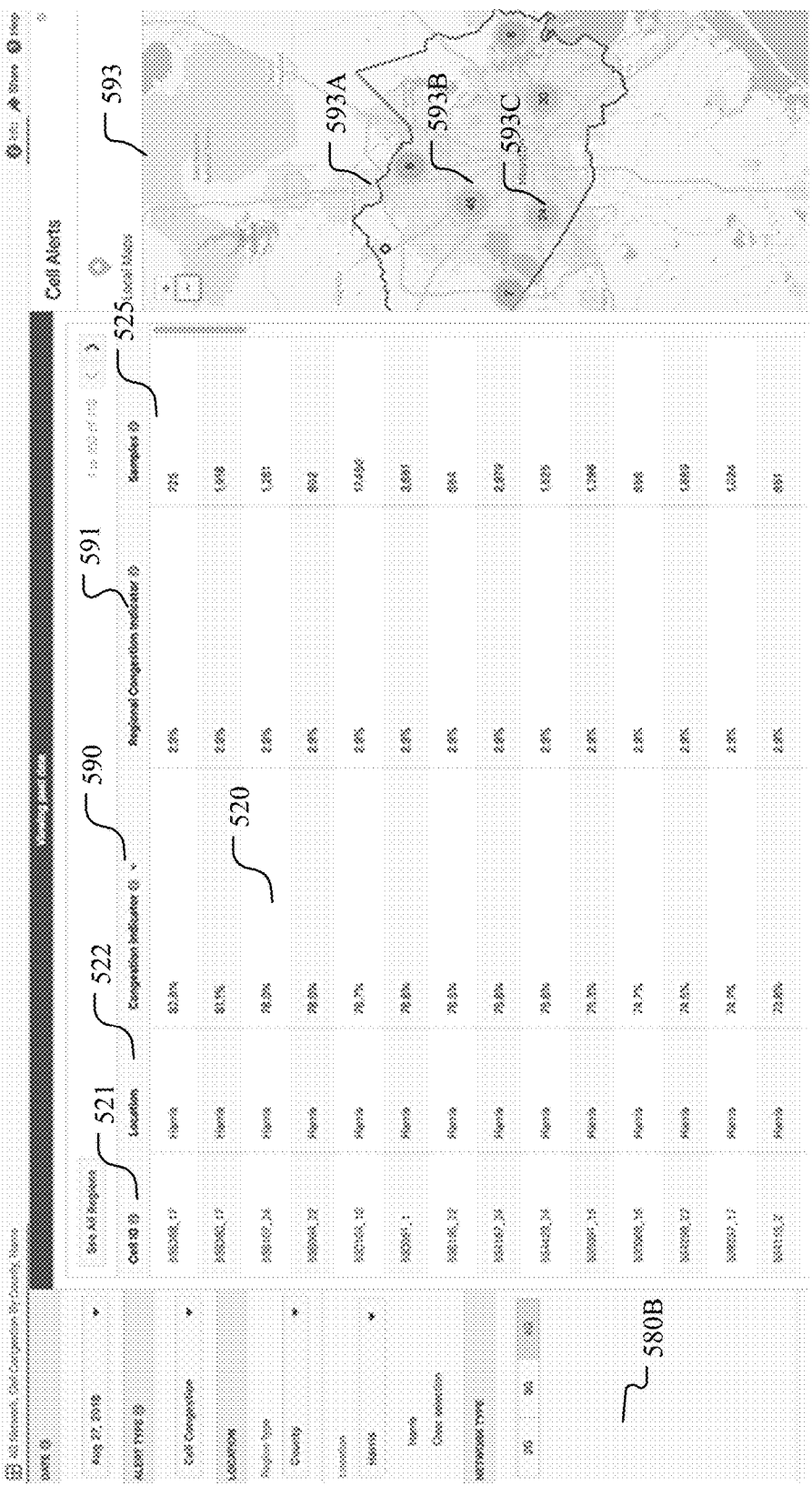
Figure 5F:
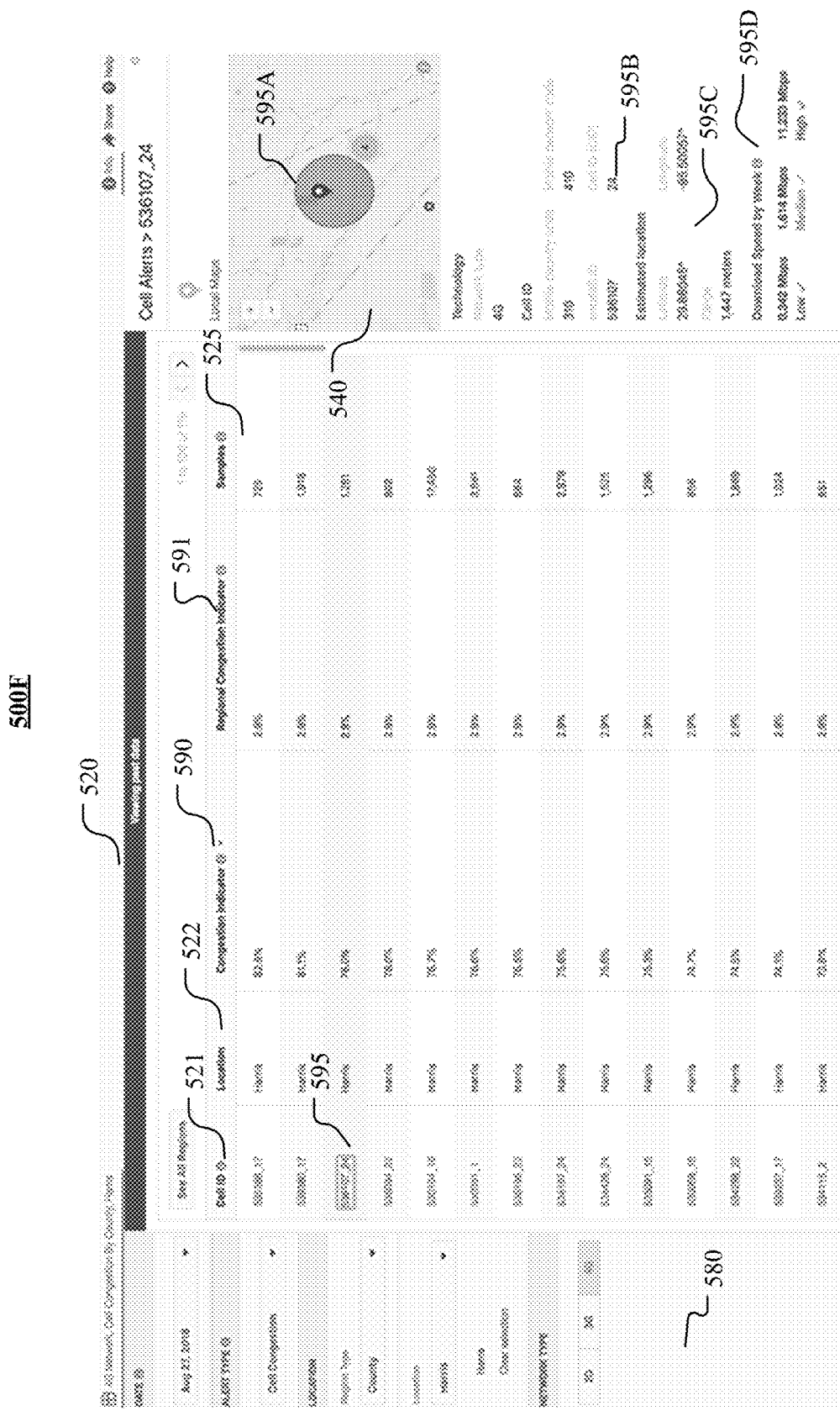

As illustrated in FIG. 5D, the user interface 500D may include the configuration panel 580B, the table 520, and the charts (e.g., 550, 554, 555), etc. The configuration panel 580 may include a number of drop-down menus (e.g., 581B, 582B, 583B, 584B) and segmented buttons (e.g., 585B) allowing users to configure or select displayed content according to different attributes, for example, date, alert type, location, region type, network type, etc. The table 520 may have a number of rows and columns. Each row of the table 520 may include a cell alert and each column of the table 520 may be corresponding to a supporting attribute associated with the cell alert (e.g., cell identification 521, location 522, congestion indicator 590, regional congestion indicator 591, number of samples or requests 525, etc.). The user interface 500D may further include the chart 550 for displaying download speed by time of day using bar charts, the chart 555 for displaying the download speed by week, the chart 554 for displaying network latency metric (e.g., round trip time). FIG. 5E illustrates a user interface 500E, which may include the configuration panel 580B, the table 520, and a map 593. The map 593 may display an area of interest 593A (e.g., configured through the configuration panel 580B) corresponding to the currently displayed network congest alerts in the table 520. The map 593 may include a number of network congestion indicators (e.g., 593B, 593C) corresponding to the network congest alerts in the table 520. FIG. 5F illustrates a user interface 500F displaying an alerted cell 595 being selected in the table 520 which displays a list of cells with congestions. Once the alerted cell 585 is selected, the user interface 500F may display the corresponding areas 595A in the map 540. The user interface 500F may further display other information related to the selected cell 595, for example, cell identification 595B, location 595C, download speed by week 595D, etc.

In particular embodiments, the system may assign values to each map tile to provide benchmarking context to the users of the system. The map tiles may be displayed on the map overlapping the cells covered by networks. The map may display data as aggregated through and normalized by regions or locations. In particular embodiments, the system may display information of relative network performance (e.g., comparing with other carriers) in the areas of interests. In particular embodiments, the system may focus on areas with high number of samples or requests, which indicate the high demand for the network connectivity in those areas and high likelihood that these area worth further investments. In particular embodiments, the system may help MNOs to prioritize the network performance metrics to make better decisions for network optimization or upgrading.

Alert Database

In particular embodiments, the system may include a cell alert database which may store all the cell alerts that are generated by the system for particular queries. The cell alert database may have a standard scheme which may be consistent across all alerts. The cell alert database may include different types of cell alerts including, for example, congestion alerts, coverage alerts, network speed alerts, etc. The cell alerts may have a number of associated attributes including, for example, associated cells, associated polygons, associated raking scores based on network congestion metrics, etc. The cell alerts reported to the MNOs may be filtered to include only the high important alerts and may be ranked by one or more associated attributes. The cell alerts may further include supporting attributes (e.g., root cause analysis results) to explain why a certain cell alert have a high or a low-ranking score. For example, the supporting attributes may include the values of the network congestion metrics (e.g., ratios as described by Equations 1-6) as explanation for the ranking score the cell alerts. As another example, the supporting attributes may include the root cause analysis results which may indicate that the network performance degradation is caused by the large number of user requests.

In particular embodiments, the system may include a portal which is associated with the cell alert database and network metric database. The portal may provide logging information about cells of interest, for example, information showing the cell status change over time. The portal may generate events associated with the cells of interest and store these events in an event database, which can be used as supporting inputs to the cell alerts. In particular embodiments, the event database may be used to train a machine-learning (ML) model which can associate specific actions (e.g., optimization actions) with the improvements of the network performance. The knowledge gained form the event-based learning may be used to further improve the system for optimizing network performance. The event data may further include information related to user feedback, such as, flags, thumb up, thumb down, etc., which may provide useful feedback for the system optimizing network performance.

Optimization Recommendations

In particular embodiments, the system may generate recommendations for upgrading the network (e.g., upgrading capacity, moving to 4G/5G, tuning cellular towers, tuning antenna angles, adding more sectors, adding fiber links, shifting investment to right bucket, strengthening fiber backhaul) based on a priority score determined by the system. For example, the system may recommend prioritizing upgradation on the cells having the more severe congestion or coverage problems. As another example, the system may recommend shifting investment to optimize the aspects of the network that can be most effective to improve the network performance and help MNOs to make better decision for improving the network performance with a limited investment budget. In particular embodiments, the system may perform or recommend optimization (e.g., at platform level, infrastructure level, device level, or application level) based on information of the user devices (e.g., data plans, device models, device speeds, operating system versions). For example, the system may filter the user devices by data plans or device models and provide customized services to those devices to enable the users the have best possible user experiences. As another example, the system may filter out the user devices (e.g., non-compatible device models) that cannot support user experiences meeting a minimum quality standard for certain services (e.g., high-resolution videos, resource-consuming effects) and may not provide these services to these devices. As another example, the system may filter out locations (e.g., areas, cells, regions) where the network performance cannot provide user experience meeting a minimum quality standard and may not provide the non-supported services to those locations until the network performance is optimized or improved. In particular embodiments, the system may generate network optimization and plans for long term optimization/planning (e.g., upgrading network to 4G/5G, adding fibers, strengthening fiber backhaul), short term optimization/planning (e.g., tune tower antenna angles, balancing demands and capacity), or real time optimization/planning (e.g., providing customized services based the status of the network and user devices). In particular embodiments, the network performance may be optimized based on one or more performance parameters including, for example, a load balancing factor, a handover, or a throughput. The network performance may be optimized by aggregating communication networks of different carriers or providers.

In particular embodiments, the optimization recommendation may be performed using heuristic projection algorithm. In particular embodiments, the optimization recommendation may be performed using a machine-learning (ML) model which is trained based on historical data. When MNOs take actions to fix or optimize network with congestions, the related data and actions may be stored in a database to train the ML model. The ML model may fine tune the future recommendations for different use scenarios based on the training by the historical action data or/and the monitored impact of the actions. The ML may predict the outcome of certain optimization actions and may weigh the importance of congestion alerts based on the expected outcome or the possible outcome of possible optimization actions.

Real-Time Optimization

In particular embodiments, the one or more servers of the computing system may send one or more network change requests to one or more computing devices. These network change requests may result in a computing device displaying a message for the user, suggesting to change the current network, or may interact with the operation system or an application of the computing device to automatically change the current network. This would allow a network to offload some of its users to another communications network, e.g. another cellular network or a broadband wireless network. The interaction of the network change requests with the computing device may depend on computing device settings, e.g. a user might prohibit automatic network changes or only allow certain applications to change the network they use. Such network change requests would allow for a real-time optimization of a communications network, they also could be timed or include point in time information or expiration information to optimize the network in a time-based fashion, e.g. offload computing devices for and during planned maintenance windows.

Other Network Performance Metrics

In particular embodiments, the network performance metrics may include congestion metrics, coverage metrics, or/and network speed metrics. The congestion metric for a cell may be based on the average download speeds of busy hours and non-busy hours (e.g., as described in Equations 1 and 2). The coverage metric of a cell may be based on the network signal strength, number of connected towers, or/and signal stability status of that cell. The network speed metric of a cell may be based on one or more networks speed, such as, the highest network speed of a time period, the lowest network speed of a time period, or the average network speed of a time period (e.g., mean, median, mode). In particular embodiments, the system may suppose that a lower metric value (e.g., weaker signal strength, lower network speed) indicates worse network performance. In particular embodiments, the system may suppose, for some network performance metrics, that a higher metric value indicates worse network performance. The system may compare the network performance metric to a threshold to determine network congestion or network coverage issues. The threshold may be corrected and normalized based on sample volume (e.g., less sample points may need a higher bar for detecting congestion or coverage issues). The congestion and coverage issues detection may be based on empirical data of the network and are scalable to communication networks of any scales.

In particular embodiments, the system may compare the network performance metric (e.g., download speeds, ratios, signal strengths) of a cell to that of a regional average (e.g., for a region covering or associated with that cell) to evaluate the network performance for that cell. In particular embodiments, the system may provide empirical-based bias corrections on sample values to handle the cases where the number of samples may be very small or large. The empirical-based bias correction may be scaled to any level needed by the system. In particular embodiments, the system may use a temporal change (e.g., a drop) of one or more network performance metrics for determining network performance (e.g., detecting congestion and coverage issues). For example, the system may detect a drop of network performance (e.g., indicated by congestion metric) comparing to the average performance over a period of time (e.g., 12 weeks). The system may identify a congestion issue or coverage issue when the drop is greater than a threshold. In particular embodiments, the system may model the actual network behaviors, for example, worst performance, peak-performance, peak-to-worst performance comparison, peak-to-peak performance comparison, etc. In particular embodiments, the system may detect network congestions based on trends (e.g., determined via linear regression) of the network performance.

In particular embodiments, the system may determine a correlation between a quality of experience metric and a network demand metric and may predict a time for a future network traffic congestion in the one or more geographic areas based on the correlation of the quality of experience metric and the network demand metric. In particular embodiments, the system may detect the network congestions by determining whether the download speed is degrading (and how much is the degradation, if any) in an area when the total traffic volume of the network increases or is higher than a threshold in that area. In particular embodiments, the system may predict a network congestion in an area based on the collected data or/and historical data of the network in that area or other areas. For example, the system may use a machine-learning model, which is trained by historical data of that area or many other areas, to predict the network congestion and determine when the network congestion would happen.

In particular embodiments, the system may perform time series analysis to determine a temporal domain anomalous event (e.g., a sudden spike of network traffic of particular day or time windows) related to the network traffic in one or more selected areas covered by the communication network. For example, the system may compare a network traffic volume in the areas to an average network traffic volume of these areas or one or more other areas and identify a sudden spike of network traffic when the network traffic volume is higher than the average network traffic volume by a threshold multiplying factor (e.g., 2 times, 3 times, 5 times). In particular embodiments, the identification of temporal domain anomalous events may be based on network traffic data points per hour per individual day of a number of days which may include more information than the network traffic data points of per hour all days aggregating a number of days.

Example Method for Congestion Detection

Figure 6:
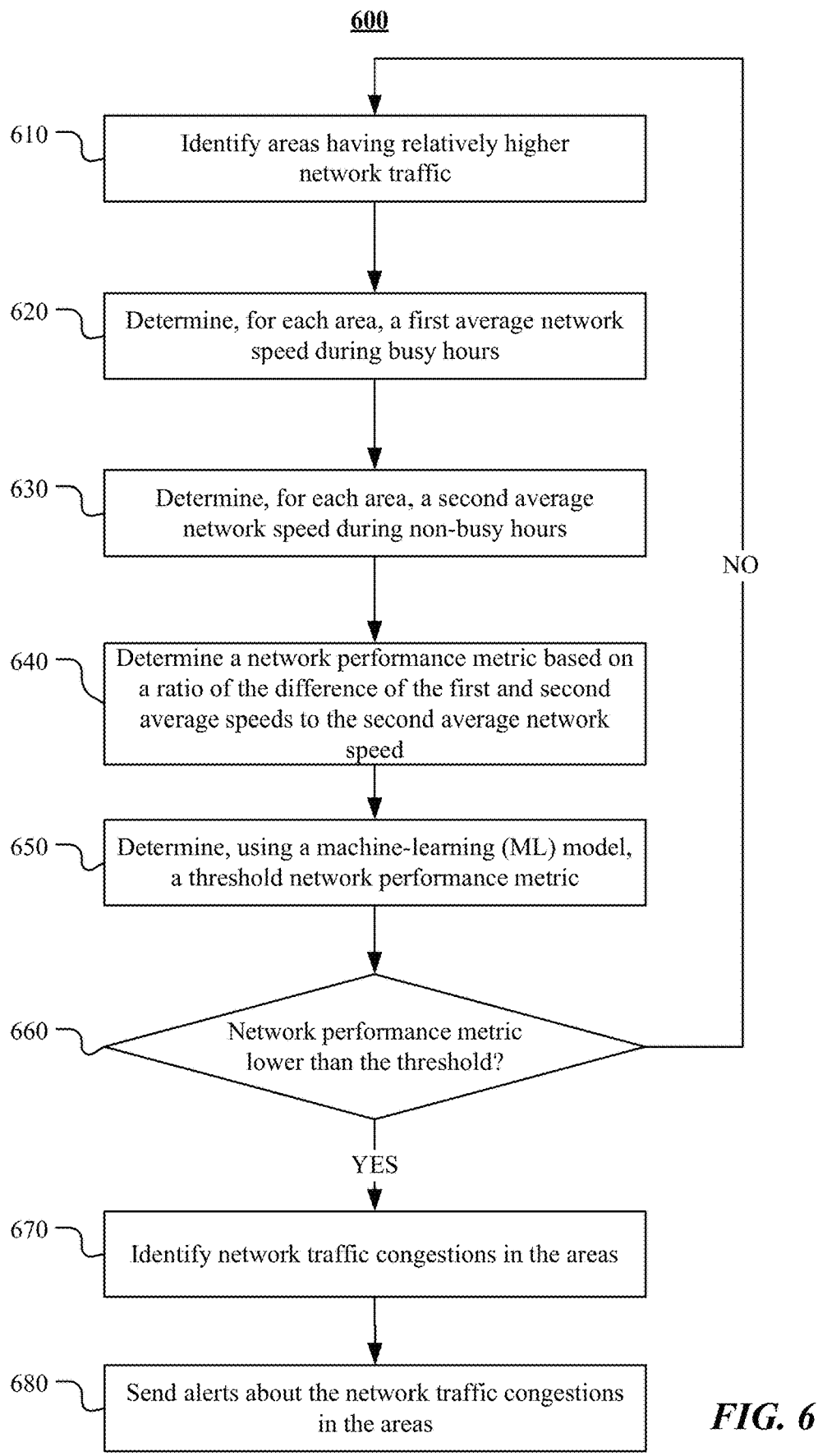
FIG. 6 illustrates an example method for detecting network traffic congestions in geographical areas covered by a communication network.

FIG. 6 illustrates an example method for detecting network traffic congestions in geographical areas covered by a communication network. In particular embodiments, the areas may be cell areas in a cellular network or other geographic areas covered by the communication network. At step 610, the system may identify one or more areas covered by the communication network and the identified areas may have relative higher network traffic volume than other areas in the communication network. In particular embodiments, the high network traffic volume areas may be identified based on a determination that the network traffic volume in those areas is higher than a pre-determined threshold volume or network traffic volume of other areas.

At step 620, the system may determine, for each identified area, a first average network speed during busy hours (or busy time periods) of the communication network in that area. At step 630, the system may determine, for each identified area, a second average network speed during non-busy hours (or non-busy time periods) of the communication network in that area. In particular embodiments, the first and second average speeds may be a mean speed, a median speed, or a mode speed of corresponding hours or time periods. In particular embodiments, the first and second average speeds may be determined based on network traffic data points per hour per each individual day of a number of days. In particular embodiments, to reduce the required computation resources (e.g., CPUs, time, memory), the first and second average speeds may be determined based on network traffic data points per hour all days aggregating a number of days. The network traffic data points per hour all days may include aggregated network speeds which may be a mean speed, a median speed, or a mode speed of corresponding time periods (e.g., hours) aggregated from a number of days. In particular embodiments, the first and second average network speeds may be determined based on network traffic data points during a number of prior time periods (e.g., minutes, hours, days). In particular embodiments, the busy hours or busy time periods of the communication network in that area may be determined based on a determination that the communication network traffic volume is higher than a threshold volume for busy hours during those hours or time periods. The non-busy hours or time periods may be determined based on a determination that the communication network traffic volume is lower than a non-busy hour threshold volume during those hours or time periods.

At step 640, the system may determine a network performance metric based on a ratio of the difference between the first and second average network speeds to the first or second average network speed. In particular embodiments, the network performance metric may be used to indicate the severity of the network traffic congestions. In particular embodiments, the network performance metric may be based on linear regression slopes of network speeds and a majority voting on the slopes. At step 650, the system may determine a threshold network performance metric using a machine learning (ML) model which may be trained by manually labeled network traffic congestion data. In particular embodiments, the ML model may include a classification model or a tree model. In particular embodiments, the threshold network performance metric may be adjusted by the ML model or manually to balance a precision metric and a recall rate related to network traffic congestion identification.

At step 660 the system may compare the determined network performance metric (e.g., the ratio) to the threshold network performance metric determined by the ML model. At step 670, when the network performance metric is lower than the threshold, the system may identify a network traffic congestion in that area. In particular embodiments, the system may identify network traffic congestion in multiple areas and rank those areas by congestion severity as indicated by the network performance metric. At step 680, the system may send one or more alerts to operators of the communication network about the identified network traffic congestions in one or more areas. The system may also send a list of areas having the identified network traffic congestions and the list of areas may be ranked by congestion severity as indicated by the network performance metric. When the system does not detect network traffic congestions, the system may jump to step 610 or 620 to continue to monitor and analyze the communication network traffic.

In particular embodiments, the system may further optimize network performance to increase the capacity of the communication network in the one or more geographic areas having network traffic congestions. The network performance may be optimized based on one or more performance parameters including, for example, a load balancing factor, a handover, or a throughput. The network performance may be optimized by aggregating communication networks of different carriers or providers. In particular embodiments, the system may further determine a correlation between a network performance degradation and a network traffic status or a network traffic change. In particular embodiments, the system may determine a correlation between a quality of experience metric and a network demand metric and may predict a time for a future network traffic congestion in the one or more geographic areas based on the correlation of the quality of experience metric and the network demand metric. In particular embodiments, the system may determine quality of experience metrics based on a network download speed and network demand metrics based on a request number of download requests.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for detecting network traffic congestions in one or more areas covered by a communication network including the particular steps of the method of FIG. 6, this disclosure contemplates any suitable method for detecting network traffic congestions in one or more areas covered by a communication network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Determining Network Metrics

Quality of Experience (QoE) Metrics

1. QoE Key Quality Indicators (KQIs) or KPIs

In particular embodiments, the system may perform root-cause analysis for areas with low QoE to identify the causes behind the low QoE in those areas. Herein, the term "root-cause" or "root cause" may refer to any causes or reasons (at any levels) that lead to or contribute to one or more low QoE problem in one or more associated areas. In particular embodiments, the system may determine one or more QoE metrics indicating the level of QoE as experienced by end users of the communication network. In particular embodiments, the QoE metrics may include one or more QoE related key quality indicators (KQIs) or key performance indicators (KPIs), for example, network speed (e.g., network speed at all hours, network speed at busy hours, network speed at non-busy hours), network latency (e.g., network latency at all hours, network latency at busy hours, network latency at non-busy hours), packet loss metric (e.g., packet loss at all hours, packet loss at busy hours, packet loss at non-busy hours), etc. In particular embodiments, the network speed may be download speed at all hours, download speed at busy hours, upload speed at all hours, upload speed at busy hours, connection speed at all hours, connection speed at busy hours, network speed fluctuation at all hours, network speed fluctuation at busy hours, etc. In particular embodiments, the network latency may be one-way latency at all hours, one-way latency at busy hours, upstream latency at all hours, upstream latency at busy hours, downstream latency at all hours, downstream latency at busy hours, backhaul latency at all hours, backhaul latency at busy hours, round-trip latency at all hours, round-trip latency at busy hours, etc.

2. QoE Score

In particular embodiments, the QoE metrics may be composite metrics including one or more QoE component metrics. For example, the QoE may be measured by a composite of QoE related metrics (e.g., KQIs or KPIs), such as, download speed at all hours, download speed at busy hours (or busy time), network latency at all hours, network latency at busy hours (or busy time), packet loss at all hours, packet loss at busy hours (or busy time), etc. In particular embodiments, the QoE metrics may include a score of QoE which indicates the satisfactory level of the network connection experiences when the end users use applications. The score of QoE may be determined using a mapping function which may map one or more QoE related KQIs or KPIs to a QoE score. For example, the QoE score can be a result of a mapping function based on download speed and network latency. In particular embodiments, the QoE metrics or QoE component metrics may be measured from end user's perspective, for example, from the end user's application experience perspective.

3. Low QoE Metrics

In particular embodiments, the system may determine one or more low QoE metrics which may be used to indicate low levels of QoE as experienced by end users of the communication network. In particular embodiments, the low QoE metrics may include one or more low QoE components, for example, low download speed, high network latency, low video viewing quality, video playback freezing, etc. In particular embodiments, instead of being used as QoE metric or QoE component metric, latency can be used as root-cause metric for potential causes (e.g., for low download speed) and can be further analyzed for next level of causes (e.g., high upstream latency, high downstream latency, etc.). In particular embodiments, the low QoE metrics may could also include the temporal changes of the QoE (e.g., download speed drop, latency increase, network speed fluctuation, etc.). In particular embodiments, the temporal changes may be measured week over week, week over 12 weeks, 4 weeks over 12 weeks, etc. For example, the temporal changes may be the change of a metric (e.g., a QoE metric) in current week compared against the one or more prior weeks. Through this comparison, the system may determine week-over-week changes (e.g., week-over-week download speed drop, week-over-week latency increase, etc.), the metric in the current week compared against the 4 weeks prior to the current week (not including the current week), the metric in the current week compared to the metric in the 12 week prior to the current week, or/and the metric change comparing the last 4 weeks (i.e., the current week and the 3 weeks prior to the current week) against the 12 weeks prior to the last 4 weeks, etc.

Root-Cause Metrics

In particular embodiments, the system may perform root-cause analysis for the detected low QoE problems (e.g., congestion or coverage problems) associated with one or more areas of interest. In particular embodiments, the system may determine one more root-cause metrics for root-cause analysis. The root-cause metrics may include one or more KQIs or KPIs that are related to the QoE of interest. For example, the root-cause metrics may include signal strength as indicated by one or more signal strength parameters such as reference signal received power (RSRP), received signal strength indicator (RSSI), etc. A low signal strength level in an area may indicate a coverage problem in that area. The root-cause metrics may also include reference signal received quality (RSRQ) which is related to signal interferences. In particular embodiments, the root-cause metrics may include signal strength, signal interference, upstream latency, downstream latency, latency in the core network, latency in radio access network, congestion indicator, congestion metric, number of samples, number of users, etc. In particular embodiments, the congestion indicators or congestion metrics may be derived from the degradation of the download speed at the busy time and non-busy time of the day, where the busy and non-busy times of the day can be derived based on the amount of traffic or number of samples of a period of time (e.g., hour, half an hour, etc.). The potential root causes and corresponding root-cause metrics may link the low QoE problems to one or more potential solutions for optimizing the communication network and improve the QoE in associated areas.

Data Aggregation for Root-Cause Analysis

As described earlier in this disclosure, in particular embodiments, the system may collect and aggregate the network performance data of the communication network. For example, the system may collect raw application data of end users of the communication network through one or more APIs. In particular embodiments, the system may collect the application data from the application layer based on connecting requests of end users. Each connecting request may be associated with a timestamp which may also be recorded with the associated request and application data. In particular embodiments, the collected data may include the identification of a serving cell which the users' mobile devices are connected to. The collected data may also include the counters related to the total bytes of the information delivered and the time spent for delivering of this information. The system may use the recorded counters and the time spent for delivering corresponding information to derive one or more QoE metrics (e.g., download speed, amount of delivered data, etc.).

In particular embodiments, the system may pre-process, clean and aggregate the collected data for determining one or more QoE metrics and root-cause metrics. For example, the system may determine the download speed based on the collected counters data and the time spent for delivering corresponding information. The system may make the cell identification unique by concatenating certain information (e.g., air interface technology type). As another example, the system may aggregate the collected data per cell bases by aggregating all the requests of the applications (e.g., mobile applications) from all the devices associated with a particular cell. In particular embodiments, the system may aggregate collected data on the temporal dimension, for example, per hour for each individual day, per hour for a duration of N days (7 days, 28 days, or any suitable number of days). In particular embodiments, the system may calculate the number of samples associated with the aggregated data unit. For example, the number of samples may be associated with aggregated data unit every hour for each individual day. As another example, the number of samples may be associated with aggregated data unit every hour for a duration of N days. The number of samples may be used as indication of traffic amount or connection demand level. In particular embodiments, the system may calculate the total amount of bits delivered (e.g., aggregated for each hour for each individual day or aggregated for each hour for a duration of N days) as indication of the traffic amount or demand level instead of the number of samples. In particular embodiments, the system may use both the number of samples and the total amount of bits delivered as the indication of the traffic amount or demand level.

Low QoE Determination

Low QoE Criteria

In particular embodiments, the system may use a set of criteria to determine low QoE in one or more areas (e.g., cells, tiles, regions). For example, the set of criteria may include one or more thresholds. The threshold may be an absolute value threshold, a percentage threshold (e.g., worst 3 percent, worst 5 percent, worst 10 percent), a percentile threshold (e.g., worst 97 percentile, worst 95 percentile, worst 90 percentile), etc. Herein, an area having QoE among worst X percentile may mean that that area has QoE worse than X percent of all the areas of interest. For example, an area may be referred as having QoE of worst 97 percentile when the area has worst QoE than 97% of all the areas of interest (e.g., all areas of the network, all monitored areas, all areas of interest). In particular embodiments, the system may determine that an area has low QoE based on a determination that at least one QoE metric associated with that area meets a low QoE criteria (e.g., among worst 90 percentile or worst 95 percentile). In particular embodiments, the thresholds to determine low QoE may be learnt via clustering or anomaly detection.

In particular embodiments, the area of interest may be the area including a number of cells, tiles, regions, etc. In particular embodiments, the area of interest may be the area including a group of cells satisfying certain conditions, or in certain categories. For example, the group of cells may be a group of cells operating at certain frequency band (e.g., 800 MHz band, 2.6 GHz band, etc.), a group of cells operating at certain frequency band and with certain bandwidth (e.g., a group of cells at 2.6 GHz band and with bandwidth of 5 MHz, a group of cells at 2.6 GHz band and with bandwidth of 3 MHz, etc.), a group of cells of certain network generation or network connection type (e.g., 2G, 3G, 4G, 5G, Wi-Fi, etc.), a group of cells operated by certain mobile network operator, a group of cells satisfying certain combination of conditions (e.g., frequency band, operator, network generation, a postal code, a county, etc.).

In particular embodiments, the thresholds may be determined using machine learning (ML) algorithms. When the QoE is measured by a composite QoE metric (e.g., including multiple QoE component metrics such as download speed at all hours, download speed at busy hours, network latency at all hours, network latency at busy hours), each individual QoE component metric may have its own threshold, and the low QoE may be determined if any of the individual component metric of the QoE meets the low QoE criteria (e.g., below the corresponding thresholds). In particular embodiments, as an alternative, all the individual component metrics of the composite QoE metric may have a same threshold (e.g., worst 90 percentile or worst 95 percentile) and the low QoE may be determined if a combination of the QoE component metrics meets the low QoE criteria (e.g., below the threshold). In particular embodiments, as another alternative, a QoE score may be determined based on multiple QoE component metrics and a mapping function. For example, the QoE score may be a weighted sum of multiple QoE component metrics where the weight may indicate the importance of each component metric for QoE. The QoE score may be compared to a QoE score threshold, and the QoE may be determined as low QoE if the score is worse than the low QoE threshold score.

In particular embodiments, the system may determine the low QoE threshold values based on the total number of cells that are being monitored. For example, if the total number of cells being monitored is less than a first total number threshold (e.g., 10k), the system may use a 90-percentile threshold to include more low QoE cells. When the total number of cells being monitored is equal to or higher than the total number threshold, the system may use a 95-percentile threshold or a 98-percentile threshold to include less low QoE cells. In particular embodiments, the system may use a global threshold per carrier per country and identify low QoE cells when one or more QoE metrics of these cells meet the global threshold (even if they do not meet the percentile threshold criteria). In particular embodiments, the system may determine perform root-cause analysis and generate optimization for cells with high demand and network congestion even if these cells have relative good QoE (e.g., not meeting the low QoE criteria). In particular embodiments, the system may limit the identified low QoE cells to be within 1000 cells.

Determination Process

In particular embodiments, the system may identify one or more areas (e.g., cells, tiles, regions) with low QoE by detecting low QoE problems in these areas. The low QoE problems may be detected based on one or more QoE metrics. In particular embodiments, the system may calculate a percentile value for each QoE metric of each area. The percentile value may indicate that, for this particular QoE metric, the associated area is worse than how much percentage of areas among the group of the areas being monitored. For example, the system may determine for download speed metric that the corresponding percentile value is 0.90 (with the worst download being 1 and the best download speed being 0). This percentile value of 0.90 may indicate that the associated areas has a download speed slower than 85% of areas among all areas of interest being monitored. After the percentile value of each QoE metric of each area has been determined, the system may apply the set of criteria (e.g., thresholds) for filtering the QoE metrics to determine the low QoE areas. For example, with a 95-percentile threshold for download speed, the system may determine any area with 0.95 or higher percentile value for download speed as the low QoE areas, which have slower download speed than at least 95% of the areas of interest.

Low QoE Examples

As an example and not by way of limitation, the system may determine the QoE percentile for each cell within a group of cells of interest which are monitored. The QoE percentile may be determined based on an individual QoE metric (e.g., download speed, download speed at busy hours, network latency) or a composite QoE metric (e.g., QoE score based on one or more QoE component metrics). Then, the system may identify and mark the cells with worst QoE (e.g., indicated by QoE scores or one or more QoE metrics) as the low QoE cells in the group of cells according to a set of criteria. For example, the system may identify and mark those cells which have one or more QoE metrics (or each of all the QoE component metrics) within the worst percent threshold (e.g., 3%, 5%, 10%, etc.) as the low QoE cells. The cell being marked as low QoE cells may be among all the cells of interest that are monitored, for example, all the cells in a region, all the cells in a country, all the cells of a particular network generation (e.g., 2G, 3G, 4G) of a particular carrier, all the cells of particular network, etc.

As another example, if the download speed of a cell is worse than the low QoE percentile threshold (e.g., worst 97 percentile, worst 95 percentile, worst 90 percentile), or in other words, if the cell's download speed is within the worst percent threshold (e.g., 3%, 5%, 10%, etc.) of all the cells of interest, this cell may be identified and marked as a cell with low QoE. The download speed may be the median of the download speed of all the data samples associated with this cell. As another example, if the download speed at the busy time of a cell is within the worst percent threshold (e.g., 3%, 5%, 10%, etc.) of all the cells of interest, this cell may be identified and marked as a cell with low QoE. As another example, if the network latency of a cell is within the worst percent threshold (e.g., 3%, 5%, 10%, etc.) of all the cells of interest, this cell may be identified and marked as a cell with low QoE.

Low QoE Alerts

Generate Alerts

In particular embodiments, after the low QoE problems have been detected, the system may generate low QoE alerts for these areas. For example, the system may generate low download speed alerts, download speed drop alerts, low signal strength alerts, network congestion alerts, etc. In particular embodiments, the system may determine the QoE in one or more areas based on one or more QoE metrics or/and the relationship among multiple QoE metrics to generate the low QoE alerts. In particular embodiments, the system may identify the correlations and relationships between two or more low QoE alerts (each of which may be based on one or more individual network metrics) to provide engineering directions (e.g., improving network coverage, improving network capacity) for network optimization.

Priority

In particular embodiments, the system may determine a priority score for each low QoE alert generated by the system. The priority score may be determined based on a number factors including, for example, the intention of MNOs, number of samples, predicted return of investments, the urgency of low QoE problems, etc. Then system may use a weighted sum of QoE metrics based on these factors to determine the priority score. For example, the system may predict that the return of investment based on the total traffic bits (e.g., total traffic=number of samples×download speed per sample×time used). Then, the system may determine the priority score value based on predicted return of investments, the predicted improved, increased, gained, or recovered total traffic by certain optimization actions (e.g., upgrading cell, adding new cells or traffic offloading) and the cost of these optimization actions. In particular embodiments, the system may determine the priority score based on the predicted reduced churning rate due to improved QoE and coverage, predicted increase in revenue, etc. In particular embodiments, the system may determine the priority score of low QoE alert using the following equation:

$$\text{Score} = \text{Number of samples} \times (\text{busy hours downlaod speed} + \text{download speed})/2 \quad (7)$$

where the number of samples, the busy hours download speed, and the download speed are normalized parameters within the range of [0, 1].

Root Cause Determination

Percentile Thresholds

In particular embodiments, the system may determine a set of criteria for filtering root-cause metrics. In particular embodiments, the criteria for root-cause metrics may be softer or looser than the criteria for determining low QoE to allow potential root causes of low QoE to be identified without missing the true causes. The looser criterion on the root causes at this stage may allow more potential root causes to be included to enable a further or deeper root cause analysis in which the root causes could be selected more accurately in a later refining stage. For example, if the potential cause is related to a low signal strength level, the system may further identify, in a deeper root-cause analysis process, whether the low signal strength is due to low transmit power, high path loss, low antenna gain, high interference, or/and any other factors. In particular embodiments, the system may determine a set of optimal criteria for filtering root-cause metrics. If the criterion for the root cause is too strict at the first stage, it may result in missing out potential root causes. But the criterion is too loose, it may result in generating more causes or ambiguity on identifying which is the major cause or leading root cause. In particular embodiments, the optimal criterion may be determined by testing out a number of candidate thresholds (e.g., worst 5%, worst 10%, worst 15%, worst 20%, worst 25%, worst 30%, etc.). For example, the system may compare the determined causes under different criterion to the true causes (e.g., manually identified by engineers in the fields, pre-known root causes) to determine criteria precision, recall, false positive, false negative, etc.

In particular embodiments, the system may determine a percentile value for each potential root-cause metric of each area The percentile value may indicate that, for this particular root-cause metric, the associated area is worse than how much percentage of areas among the group of the areas being monitored (which is the same group of areas for determining low QoE and may include all the areas of the group regardless the levels of QoE). As an example and not by way of limitation, the system may determine that, for signal strength metric associated with a cell, the corresponding percentile value is 0.85 (with the worst signal strength being 1 and the best signal strength being 0). This may indicate that the associated cell has signal strength worse than 85% of cells among the group of cells of interest.

After the percentile values for both QoE metrics and root-cause metrics are determined, the system may list the percentile values of each area for both QoE metrics and root-cause metrics within the group of areas (e.g., all the areas within a region, such as a county, an area with the same zip code, etc.), respectively. Then, the system may determine root causes for the low QoE areas based on the percentile values of all root-cause metrics of all cells of interest and the criteria for root-cause metrics. In particular embodiments, the system may filter the percentile values of the root-cause metrics using one or more percentile thresholds. For example, the system may use an 80-percentile threshold to filter all root-cause metrics. The root-cause metrics having percentile values less than 80 percentile may be filtered out and the root-cause metrics with 80 or higher percentile may remain after the being filtered. The remaining root-cause metrics may be identified as the indication of corresponding root causes for associated areas.

In particular embodiments, the system may use network speed, network speed at busy hours, and network latency as the QoE metrics for determining the low QoE cells of the cellular network. The system may use the signal strength, congestion metric, and number of samples as the root-cause metrics for determining the root causes for the low QoE cells. In particular embodiments, the system may determine that a cell has a low QoE if either of the three QoE metrics (e.g., download speed, download speed at busy hours, network latency) is among the worst 90-percentile (worst 10%). The percentile threshold for determining the low QoE cells may be determined and modified based on the requirement for low QoE. For example, the system may include less cells as low QoE cells by tightening the threshold of low QoE (e.g., worst 3%, worst 5%). In particular embodiments, for determining the potential root causes for low QoE, the system may mark the root-cause metrics within the worst 80-percentile as indication of potential causes. The 80-percentile threshold for filtering the root-cause metrics is looser than the 90-percentile for filtering the low QoE metrics, which may allow the system to include more potential root causes and avoid missing the true causes.

Number of Samples and Occurrence Frequency

In particular embodiments, the system may use additional filters to filter out cells which have the number of samples below a sample-number threshold (e.g., 100). A small number of samples may indicate a low demand, and therefore a low priority for optimization of the associated cell. For example, the system may identify a group cells having low QoE and low number of samples (e.g., below the sample-number threshold) during the low QoE determination process. The system may filter that group of cells out and exclude these cells from the later process of determining root causes and generating optimization recommendation because the low demand in these cells may indicate a low priority for optimization. In particular embodiments, the system may also use the additional filters to filter out cell alerts (e.g., low download speed alerts, low signal strength alerts, congestion alerts, etc.) if the occurrence frequency of those cell alerts is below a threshold (e.g., 50%) during a period of time (e.g., the past 6 weeks including the current week). A low occurrence frequency of these alerts may indicate a relative low level of severity of the QoE problems and a low priority for optimizing the associated cell.

Determination Process

FIGS. 7A-C illustrate an example process for determining causes for a number of low QoE cells of a cellular network. As an example and not by way of limitation, the system may collect and aggregate the application data from end users of the cellular network. The system may use network speed, network speed at busy hours, and network latency as the QoE metrics for determining the low QoE cells of the cellular network. The system may use the signal strength, congestion metric, and number of samples as the root-cause metrics for determining the root causes for the low QoE cells. The system may determine the values of all these QoE metrics and root-cause metrics based on the collected and aggregated application data for a group of cells among all the cells of interest of the cellular network, as shown in the table in FIG. 7A. The first column on the left of the table includes the cell ID associated with each cell of the group of cells. Each row of the table includes the values of the QoE metrics and root-cause metrics corresponding to a particular cell of the group of cells. Each column of the table (except the first column on left) is corresponding to a particular QoE metric (e.g., download speed, download speed at busy hour, latency) or a root-cause metric (e.g., signal strength, congestion metric, number of samples. The download speed, latency, and signal strength may be measured in units of Mbps or Kbps, milli-second or second, and dBm or mW, respectively. The congestion metric may be measured using percentage number among all cells of interest. The cells of interest being monitored may be all the cells within a region, such as a county, an area with the same zip code, a city, a province, a state, etc.

After the values of the QoE metrics and root-cause metrics have been determined, the system may calculate a percentile value for each QoE metric and each root-cause metric of each cell. The percentile value may indicate that, for this particular QoE metric or root-cause metric, the associated area is worse than how much percentage of cells among the all of cells of interest being monitored. FIG. 7B shows the percentile values corresponding the metric values as shown in FIG. 7A. As an example, the cell 1 in the first row of the table has a percentile value of 1 for latency metric, which indicates that this cell has the worst latency among all the cell of interest being monitored. As another example, the cell 1 in the first row of the table has a percentile value about 0.21 for signal strength, which indicate that the signal strength of this cell is worse than 21% of all the cell of interest being monitored.

After the percentile values of the QoE metrics and root-cause metrics being determined, the system may apply a first set of criteria on QoE metrics to determine the low QoE cells. For example, the system may use a 90-percentile threshold to filter all the QoE metrics. The percentile values below 90 may be filtered out and the percentile values equal to or above 90 may remain after the filtering. FIG. 7C shows the QoE percentile filter results in the left part of the table. The low QoE cells may be identified and selected from all the cells of interest being monitored based on the filtering results. For example, the cells shown in FIG. 7C may have at least one QoE metric having a percentile value being above the 90-percentile threshold. In particular embodiments, the system may identify a cell as low QoE cell when that cell has at least one QoE metric meeting the low QoE criteria (e.g., the 90-percentile threshold). In particular embodiments, the system may identify a cell as low QoE cell when a combination of QoE metrics (e.g., including two or more QoE metrics) all meets the low QoE criteria (e.g., having their percentile values above the 90-percentile threshold). In particular embodiments, the system may use one threshold for all the QoE metrics. In particular embodiments, the system may use different thresholds for different QoE metrics when determining the low QoE cells.

After the low QoE cells have been identified, the system may apply a second set of criteria to identify the root causes for low QoE problems in the identified low QoE cells. For example, the system may use an 80-percentile threshold to filter the root-cause metrics. The root-cause metrics with percentile values below 80 may be filtered out and the root-cause metrics with percentile values equal to or above 80 may remain after the filtering. FIG. 7C shows the root-cause metrics filtering results in the right part of the table. Each root-cause metric that remains after filtering may be used by the system as an indication of a cause of the low QoE problem of the associated cell. For example, the cell 1 in the first row of the table may have the congestion metric, which has a value about 0.99 being above the 90-percentile threshold, as an indication that the low QoE in this cell may be caused by network congestion (rather than signal strength or high demand since these two root-cause metrics are filtered out by the 80-percentile threshold). In particular embodiments, the system may use one threshold for all the root-cause metrics. In particular embodiments, the system may use different thresholds for different root-cause metrics when determining the causes for the low QoE.

Example Low QoE Cells

In particular embodiments, the system may identify that a cell has low QoE based on a determination that at least one QoE metric of that cell meet the low QoE criteria. For example, in the table of FIG. 7C, the eight low QoE cells (with cell IDs of 1, 2, 3, 4, 7, 17, 28, 37) have all three QoE metrics (e.g., download speed, download speed at busy hours, latency) being above the 90-percentile threshold. The low QoE cell 40 has two QoE metrics (e.g., download speed, latency) being above the 90-percentile threshold. The low QoE cell 44 has one QoE metric of download speed at busy hours being above the 90-percentile threshold. In particular embodiments, the system may identify low QoE cells based on a pattern, a correlation, or a combination associated with two or more QoE metrics. For example, the system may compare the download speed (at all hours) to the download speed at busy hours and determine the download speed drop during busy hours based on the comparison. The system may determine that a cell has low QoE when the download speed drop exceeds a download speed drop threshold. As another example, the system may determine that a cell has low QoE based on a determination that the cell has both download speed and network latency meeting the corresponding low QoE criteria.

Example Root Causes

In particular embodiments, the system may filter the root-cause metrics using an 80-percentile threshold to determine the causes of the low QoE of the corresponding cells, as shown in FIG. 7C. For example, the cells 1 and 2 have the congestion metric being above the 80-percentile threshold and the system may determine that the causes for the low QoE in these two cells are related to network congestions. As another example, the cells 3 and 4 have the congestion metric and the number of sampling being above the 80-percentile threshold. The system may determine that the low QoE of these two cells are caused by network congestion and high connection demand. As another example, the cell 17 and 44 have the signal strength and congestion metric being above the 80-percentile threshold. The system may determine that the low QoE in these two areas are caused by weak signal strength (network coverage problem) and network congestion. As another example, the cell 28 only has the number of samples being above the 80-percentile threshold. The system may determine that the low QoE in this cell is caused by high demand. As another example, the cell 37 has all three root-cause metrics being above the 80-percentile threshold. The system may determine that the low QoE in this cell is caused by a combination of weak signal strength, network congestion, and high connection demand. As another example, the cell 40 has the signal strength and the number of samples being above the 80-percentile threshold. The system may determine that the low QoE in this cell may be caused by a combination of weak signal strength and high connection demand.

As another example, the cell 7 has all three root-cause metrics being below the 80-percentile threshold. The system may determine that the low QoE in this cell is not caused by any of the three causes of signal strength, network congestion, or high connection demand. Further root-cause analysis (e.g., using different group of root-cause metrics, using different thresholds values) may be needed to determine the cause of the low QoE in this area. In particular embodiments, when no causes are identified for a low QoE cell, the system may generate a report listing the root causes that have been considered but eventual excluded. By excluding the wrong causes, the system may guide the network engineering to the correct direction for optimization and avoid tacking unnecessary optimization actions.

Anomaly Events Root Causes
Determination Process

In particular embodiments, the system may perform root-cause analysis for particular low QoE events, for example, network anomaly, network latency, low video QoE, congestion alerts, video play back freezing, etc. The system may first collect, pre-process, and aggregate the application data for the areas of interests. Then, the system may determine the metrics for the particular low QoE events (e.g., anomaly, latency, low video QoE, congestion alert, etc.). For example, for a network latency event, the system may upstream latency and downstream latency as the root-cause metrics for determining causes for network latency event. As another example, for a low video QoE event, the system may use video quality score, download speed, network latency, signal strength and congestion indictor as the root-cause metrics to determine the causes of the low video QoE. The system may use a first set of criteria on one or more QoE metrics to determine/detect the low QoE event and use a second set of criteria on the root-cause metrics to determine the causes. After that, the system may generate report for the low QoE event with identified causes and generate a solution recommendation for each cell affected by the low QoE event. In particular embodiments, the first or/and second set of criteria may each include one or more thresholds for corresponding metrics. The thresholds may be set up by users of the root-cause analysis system or may be learnt by machine-learning model trained by pre-labeled data which include cell data with labeled low QoE events and corresponding root causes. The labeled data may be generated by, for example, engineers in the fields, engineers who are manually monitoring or observing the cell (e.g., to see whether the cells have congestions or not), or engineers who monitor the end user experiences of application. The machine learning may be supervised learning based on one or more features derived from the aggregated data, KQIs, KPIs, etc. The machine learning may use classification methods such as decision tree to generate the thresholds, or use the division or partition conditions for each class (e.g., each low QoE event, each root cause).

Example: Anomaly Video Quality

As examples and not by way of limitation, Table 2 shows a number of cells (e.g., cell 1-4) having network latency which may be identified by the system based on the worst 5-percent threshold on the network latency (e.g., in ms).

cells of interest while the downstream latency is 170 ms which is among the worst 3% of all the cells of interest. The system may determine that the low video QoE in cell 3 is caused by the upstream latency and the downstream latency by applying a 20% threshold on upstream and downstream latency. As another example, for the cell 4, the upstream latency is 80 ms which is among the worst 40% of all the cells of interest while the downstream latency is 120 ms which is among the worst 35% of all the cells of interest. The system may determine that the low video QoE in cell 4 is not caused by the upstream latency or the downstream latency by applying a 20% threshold.

As examples and not by way of limitation, Table 3 shows a number of cells (e.g., cell 5-8) having low video QoE which may be identified by the system based on the worst 5-percent threshold on the video quality score (e.g., 0-100).

TABLE 3

| Cell Id | QoE: Video quality score (0-100) | Video download speed | Latency | Signal strength | Congestion indicator | Root causes for low video quality |
|---|---|---|---|---|---|---|
| 5 | 10/worst 2% | 40 kbps/worst 1% | 50 ms/worst 50% | −110 dbm/worst 25% | 0.1/worst 80% | Download speed |
| 6 | 5/worst 1% | 1 Mbps/worst 50% | 240 ms/worst 1% | −110 dbm/worst 25% | 0.1/worst 70% | Latency |
| 7 | 20/worst 5% | 80 kbps/worst 2% | 170 ms/worst 3% | | | Download speed, Congestion |
| 8 | 15/worst 3% | 100 kpbs/worst 2% | 120ms/worst 35% | −130 dbm/worst 1% | | Download speed, Signal strength |

TABLE 2

| Cell Id | Latency (QoE) | Upstream Latency | Downstream Latency | Root causes for high latency |
|---|---|---|---|---|
| 1 | 250 ms/worst 2% | 200 ms/worst 1% | 50 ms/worst 50% | upstream |
| 2 | 300 ms/worst 1% | 60 ms/worst 50% | 240 ms/worst 1% | downstream |
| 3 | 320 ms/worst 1% | 150 ms/worst 2% | 170 ms/worst 3% | Upstream and downstream |
| 4 | 200 ms/worst 5% | 80 ms/worst 40% | 120 ms/worst 35% | Not identified |

The cells 1-4 in Table 2 all have network latency time values being among the worst 5% of all the cells of interest. The system may use the upstream latency and the downstream latency as the root-cause metrics to for determining the causes. For example, for the cell 1, the upstream latency is 20 ms which is among the worst 1% of all the cells of interest while the downstream latency is 50 ms which is among the worst 50% of all the cells of interest. The system may determine that the low video QoE in cell 1 is caused by the upstream latency by applying a 20% threshold on upstream and downstream latency. As another example, for the cell 2, the upstream latency is 60 ms which is among the worst 50% of all the cells of interest while the downstream latency is 240 ms which is among the worst 1% of all the cells of interest. The system may determine that the low video QoE in cell 2 is caused by the downstream latency applying a 20% threshold on upstream and downstream latency. As another example, for the cell 3, the upstream latency is 150 ms which is among the worst 2% of all the The cells 1-4 in Table 3 all have video quality score values being among the worst 5% of all the cells of interest. The system may use one or more of the video download speed, network latency, signal strength, and congestion indicator as the root-cause metrics to for determining the causes of the low video QoE in these cells. For example, for the cell 5, the values of the root-cause metrics of video download speed, latency, signal strength, and congestion indicator are 40 kbps (worst 1%), 50 ms (worst 50%), −110 dBm (worst 25%), 0.1 (worst 80%), respectively. The system may determine that the low video QoE in cell 5 is caused by the download speed by applying a 20% threshold on the corresponding root-cause metrics (the download speed is among the worst 1% which is below the 20% threshold and all other three metrics are above the 20% threshold). As another example, for the cell 6, the values of the root-cause metrics of video download speed, latency, signal strength, and congestion indicator are 1 Mbps (worst 50%), 240 ms (worst 1%), −110 dBm (worst 25%), 0.1 (worst 70%), respectively. The system may determine that the low video QoE in cell 6 is caused by the network latency by applying a 20% threshold on the corresponding root-cause metrics (the network latency is among the worst 1% which is below the 20% threshold and all other three metrics are above the 20% threshold). As another example, for the cell 7, the values of the root-cause metrics of video download speed and latency are 80 kbps (worst 2%) and 170 ms (worst 3%), respectively. The system may determine that the low video QoE in cell 7 is caused by the download speed and network latency by applying a 20% threshold on the corresponding root-cause metrics (both download speed and network latency are below the 20% threshold). As another example, for the cell 8, the values of the root-cause metrics of video download speed, latency and signal strength are 100 kbps (worst 2%), 120 ms (worst 35%), and −130 dBm (worst 1%), respectively. The system may determine that the low video QoE in cell 8 is caused by the download speed and signal strength by applying a 20% threshold on the corresponding root-cause metrics (the download speed and signal strength are below the 20% threshold and the network latency is above the 20% threshold).

As examples and not by way of limitation, Table 4 shows a number of cells (e.g., cell 1-4) having download speed issues, which may be identified by the system based on the worst 5-percent threshold on the download speed (e.g., in Kbps).

TABLE 4

| Cell Id | Low download speed (QoE) | RSRP (reference signal received power) | RSRQ (reference signal received quality) | Root causes for low download speed |
|---|---|---|---|---|
| 1 | 100 Kbps/ worst 2% | −135 dbm/ worst 1% | −10 dB/ worst 50% | RSRP (coverage) |
| 2 | 50 Kbps/ worst 1% | −80 dbm/ worst 50% | −19 dB/ worst 1% | RSRQ (interference) |
| 3 | 40 Kbps/ worst 1% | −130 dbm/ worst 2% | −18 dB/ worst 3% | RSRP and RSRQ (coverage and interference) |
| 4 | 300 Kbps/ worst 5% | −90 dbm/ worst 40% | −13B/ worst 35% | Not identified |

The cells corresponding to the cell identifiers (Ids) 1-4 in Table 4 all have download speed values being among the worst 5% of all the cells of interest. The system may use the RSRP or/and RSRQ as the root-cause metrics to for determining the causes. For example, for the cell 1, the RSRP may be determined as the cause because it is within the worst 20%. The RSRP may indicate a coverage issue and the treatment solutions may be related to transmitting power setting (e.g., increasing the transmit power of the cell to increase RSRP can be higher). As another example, for cell 2, the RSRQ may be determined as the cause because it is within the worst 20%. This may be due to the interference issue which makes RSRQ bad. The treatment solution could be reducing the interference (e.g., reducing transmit power of neighboring cells in the same frequency, or using some advanced interference mitigation method). As yet another example, for cell 3, the system may determine both RSRP and RSRQ as the root causes. As yet another example, for cell 4, the system may identify no root cause for this cell using current root-cause metrics.

User Interfaces

Low QoE Report

In particular embodiments, the system may generate a report including all or a part of the cells which have low QoE. For example, the report may include the cells with lowest QoE (which is part of the cells with low QoE). As another example, the selection of the cell to be included in the report may be per geographic region, per country, per radio access network technology generation (e.g., 2G, 3G, 4G, etc.), per carrier (mobile network operator (MNO)), etc. As another example, the system may select a certain number of cells with the lowest QoE for each MNO, each network generation, each geographic region, or each country, etc.

Root-Cause Analysis UI

Figure 8A:
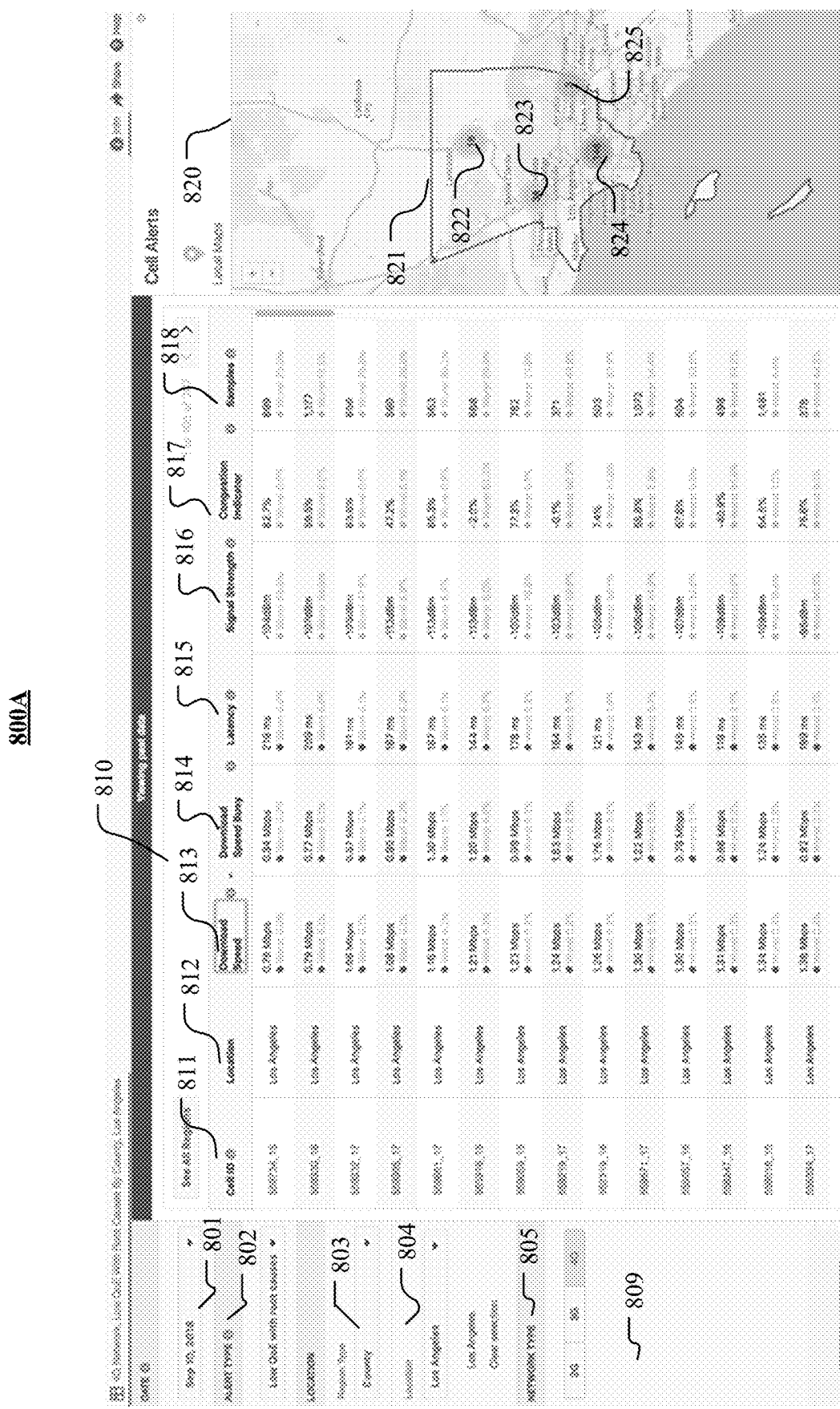
FIGS. 8A-B illustrate example user interfaces for configuring the root cause analysis and displaying the results.
Figure 8B:
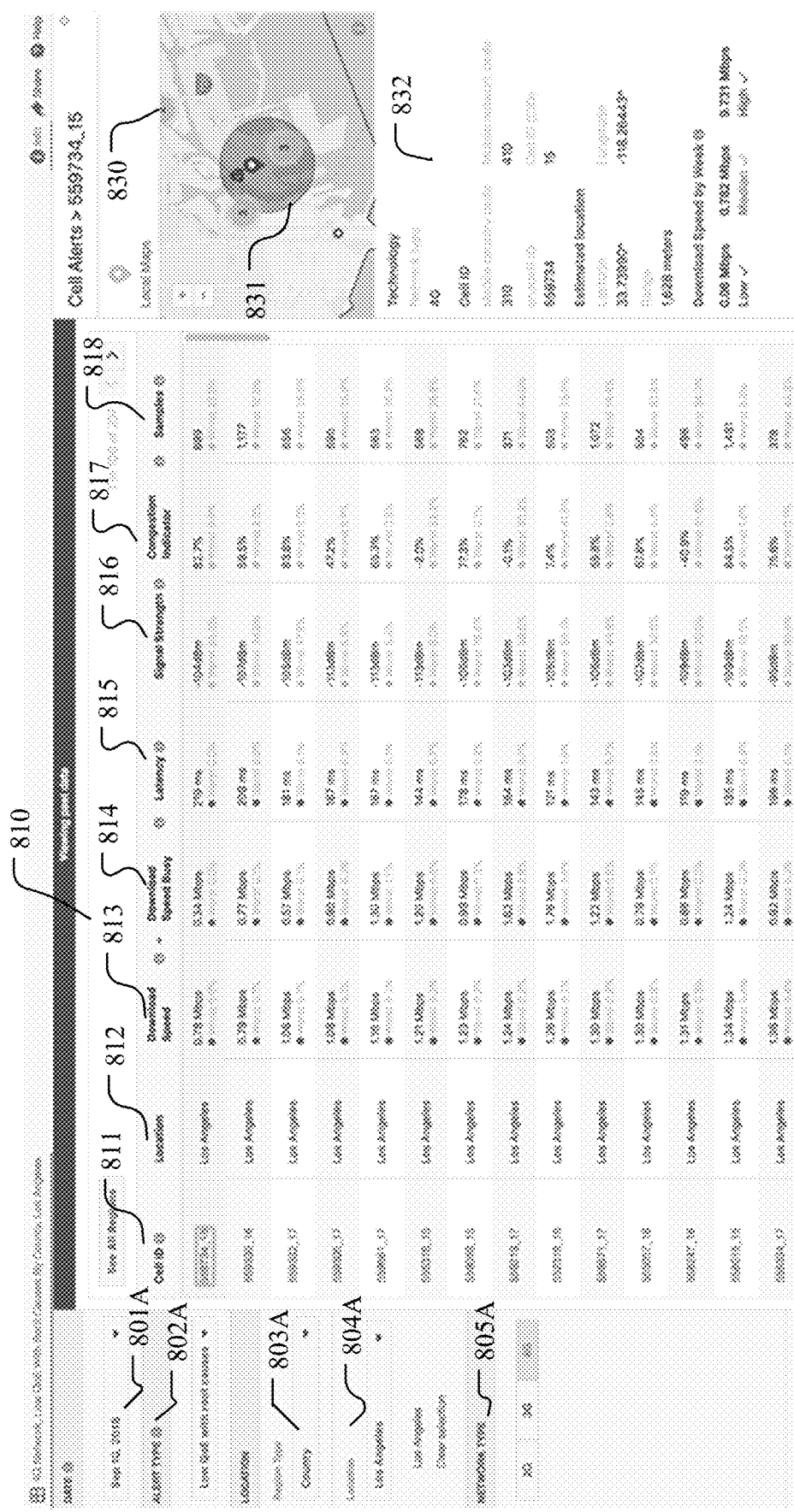

FIGS. 8A-B illustrate example user interfaces (e.g., 800A, 800B) for configuring the root cause analysis and displaying the results. As illustrated in FIG. 8A, the user interface 800A of the system may include a map 820 showing a region of interest 821 which include a number of the areas (e.g., 822, 823, 824, 825) with low QoE alerts. Each area that has low QoE alert may be indicated by a circular indicator and a number within the circular indicator. Each area may be associated one or more cells. Each cell may include one or more cell towers and each cell tower may include one or more cell sectors. In particular embodiments, the number in the circular indicators may indicate the number of cells or the number of low QoE alerts in the associated area. In particular embodiments, the circular indicator may be displayed with different colors to indicate the severity of the network congestions. The user interface 800A may further include a table 810 showing a list of cells with different QoE metrics and root-cause metrics. Each row of the table 810 may include a cell and each column of the table 810 may be corresponding to an associated attribute, a QoE metric, or a root-cause metric, for example, cell identification 811, location 812, download speed 813, download speed at busy hours 814, latency 815, signal strength 816, congestion indicator 817, number of samples or requests 818, etc. In particular embodiments, the user interface 800A may include a panel 809 for user to configure what will be analyzed and displayed. Then panel 809 may include a number of drop down menus for configuring the date 801, the alert type 802 (e.g., low QoE with root causes), the region type 803, the location 804, the network type 805 (e.g., 2G, 3G, 4G), etc.

As illustrated in FIG. 8B, the user interface 800B of the system may include a map 830 showing a particular cell (e.g., cell with ID 559734_15) with low QoE problem. The user interfaces 800B may allow a user of the system to select a particular cell from table 810. The user interface 800B may display the selected cell in the map 830 displaying the area 831 covered by the selected cell. The user interface 800B may include a display area 832 to display a number of attributes associated with the selected cell, for example, network type, cell ID, mobile country code, mobile network code, location, (e.g., latitude and longitude), range, average download speed by week, etc. In particular embodiments, the user interfaces 800A-B of the system may use elements (e.g., dots, circles) with different colors to illustrate the level severity of the associated metrics. For example, a darker color may indicate a higher level of severity and a lighter color may indicate a lower level of severity. In particular embodiments, the user interface may hide or dim the QoE metrics that haven been identified as not being associated to low QoE and the root-cause metrics that have been excluded from the identified causes for low QoE.

Low QoE Solution Recommendation

In particular embodiments, the system may generate solution recommendations or optimization recommendations to solve the low QoE problems and improve the QoE. The solution or optimization recommendations may link the QoE as experienced by end users to the network engineering based on the identified root causes of the low QoE problems. In particular embodiments, the system may determine and list the potential solutions based on the respective patterns or combinations of multiple root causes. In particular embodiments, the system may determine the optimization recommendations for cells with low QoE based on the identified root causes and connection demand in these cells (e.g., number of samples, number of connection requests, number of users, number of connected devices, traffic amount, etc.).

The system may prioritize the cells (e.g., based on the priority score) with high connection demands for generating optimization recommendation and may recommend less or no optimization for cells with low connection demands.

Coverage Issue

As an example and not by way of limitation, if QoE is low and if signal strength is bad in a cell, the system may determine that coverage issue should be a direction to optimize this cell. The solution recommendation may be generated only for cells with relative large number of samples (e.g., being above a sample-number threshold). If the demand is higher than a demand threshold in this cell as indicated by the large number samples, the system may recommend the coverage enhancement (e.g., increasing cell transmitting power, reducing interference, adding repeater, adding new cells, tuning cell antennas, etc.) as the first-choice solutions and recommend network upgrading/densification if the coverage enhancement is not enough to solve the low QoE problems. If the demand is lower than the demand threshold in this cell, the system may recommend less optimization actions (e.g., enhancing the coverage only) or recommend no optimization actions on this cell based on predicted return of investment.

Network Congestion

As another example, if QoE is low and network congestion is bad in a cell, the system may determine that network capacity could be a direction to optimize this cell. If the connection demand in this cell is higher than the demand, the system may recommend solutions such as upgrading, densification, offloading, load balancing, and any suitable optimization actions, as top priority solutions, when communication pipe improvement may not be solving the problem completely (although it could help to some extent in some cases). If connection demand in this cell is lower than the demand threshold, the system may determine that the low QoE problem is caused by narrow communication pipe (e.g., bandwidth), and may recommend pipe improvement (e.g., throughput enhancement by carrier aggregation, by MIMO, etc.) as the first direction for this cell to optimize, instead of cell densification and other optimization means. If cell pipelines could not be improved, the system may recommend network upgrading, densification, offloading, etc.

Coverage and Congestion

In particular embodiments, the system may determine the root causes for low QoE problems and generate optimization recommendations based on a combination, a pattern, or a relationship associated with multiple QoE metrics and root-cause metrics. As another example, if the QoE is low, the signal strength level is low, and the network congestion is bad in a cell, the system may determine that the cell has both coverage and capacity problems. If the connection demand in the cell is higher than the demand threshold, the system may recommend with a high priority for cell densification, upgrading, offloading, etc. If the connection demand in the cell is lower than demand threshold, the system may recommend enhancing communication pipe to improve the coverage and capacity. As another example, if the QoE is low, the signal strength is not bad, the congestion is not bad, and the number of samples is large, the system may determine that the low QoE is caused by the high demand in the cell as indicated by the large number of samples. The system may recommend cell densification, network upgrading, offloading, etc. As another example, if the QoE is low in a cell, but no root cause is identified, the system may determine that the low QoE is caused by some other causes that are not included in the currently analyzed causes. The system may recommend avoiding unnecessary or incorrect optimization (e.g., improving coverage, increasing pipe) since these optimizations will unlikely improve the QoE.

Broken Fiber

As another example, the system may determine that a congestion problem is caused by a broken fiber because a lot of cells along a certain fiber link have congestion problems. The system may recommend solution for fixing the broken fiber links. As another example, the system may determine that the congestion is caused by a problematic cell tower because all other areas around the tower have no congestion problem and the cell covered by this particular tower has congestion problem. The system may further perform the root cause analysis at sector level. The system may determine that a particular antenna sector has an antenna titling problem because its corresponding area in a particular angle of the antenna sector is the only area has a coverage problem. The system may generate solution recommendations for tuning the particular antenna sector.

Connection Demand

In particular embodiments, the system may recommend solutions based on the return of the investment considering the demand as indicated by the connection demand in the associated cell (e.g., the number of samples). For example, if connection demand is lower than the demand threshold (it could mean there is not much incentive to add new cells), the system may not recommend adding new cells. The system may use the number of samples as a weighting factor to calculate the return of investment. The number of samples may be related to the total traffic which can be gained by this network (e.g., total traffic=number of samples×average download speed per sample×time spent). The system may also use the time spent on network by users as a function of QoE. For example, low QoE may reduce the time spent on the network by users if the end users reduce app engagement due to low QoE. In particular embodiments, the system may generate solution recommendations for upgrading the network based on a priority score determined by the system. For example, the system may recommend prioritizing upgradation on the cells having the more severe congestion or coverage problems.

Machine-Learning (ML) Model

ML Determine Criteria

In particular embodiments, the system may determine the low QoE and root causes based one or more criteria (e.g., a first set of criteria for low QoE metrics, a second set of criteria for root-cause metrics). In particular embodiments, the system may determine the first or/and second set of criteria using a machine-learning (ML) model. The ML model may be trained by pre-labeled data, historical data, collected and aggregated data, QoE metric data, root-cause metric data, and previously used first set of criteria for determining the low QoE, previously used second set of criterial for determining root causes. The pre-labeled data may include cells with pre-labelled QoE levels (e.g., high, middle, low) and low QoE cells with pre-labelled root causes. The data can be manually labeled by engineers in the fields or engineers who are manually monitoring or observing the cells (e.g., network traffic congestion) or the user experiences (e.g., end users' application experience). The historical data may include previous data related to the QoE metrics, the root-cause metrics, the low QoE criteria (e.g., thresholds and corresponding metrics), the root-cause criteria (e.g., thresholds and corresponding metrics) that are determined during previous root cause analysis. The ML model may determine the metric threshold(s) based on the supervised learning from the pre-labeled data. The machine learning may use the classification method (e.g., decision trees) to generate the metric threshold(s) or conditions for categorizing network QoE into multiple categories (e.g., low QoE, middle QoE, high QoE) which may have different levels of QoE and for categorizing low QoE into multiple root cause categories. In particular embodiments, the root analysis may be performed using heuristic projection algorithm.

Machine Learning for Root Causes Determination

In particular embodiments, the low QoE and root causes for the low QoE cells may be directly determined by the ML model (e.g., as the output of the ML model). The ML model may be trained based on historical data including data related to low QoE cells with pre-labelled or previously-determined low QoE and corresponding root causes. The pre-labeled data may include cells with labelled QoE levels (e.g., high, middle, low) and low QoE cells with labelled root causes. The data can be manually labeled by engineers in the fields or engineers who are manually monitoring or observing the cells (e.g., network traffic congestion) or the user experiences (e.g., end users' application experience). The ML model may use supervised learning to determine the low QoE and the corresponding root causes. The machine learning may use the classification method (e.g., decision trees) to categorize network QoE into multiple categories (e.g., low QoE, middle QoE, high QoE) and to categorize low QoE cells into multiple root cause categories to determine the causes for the low QoE of these cells.

Example Method for Root Cause Determination

Figure 9:
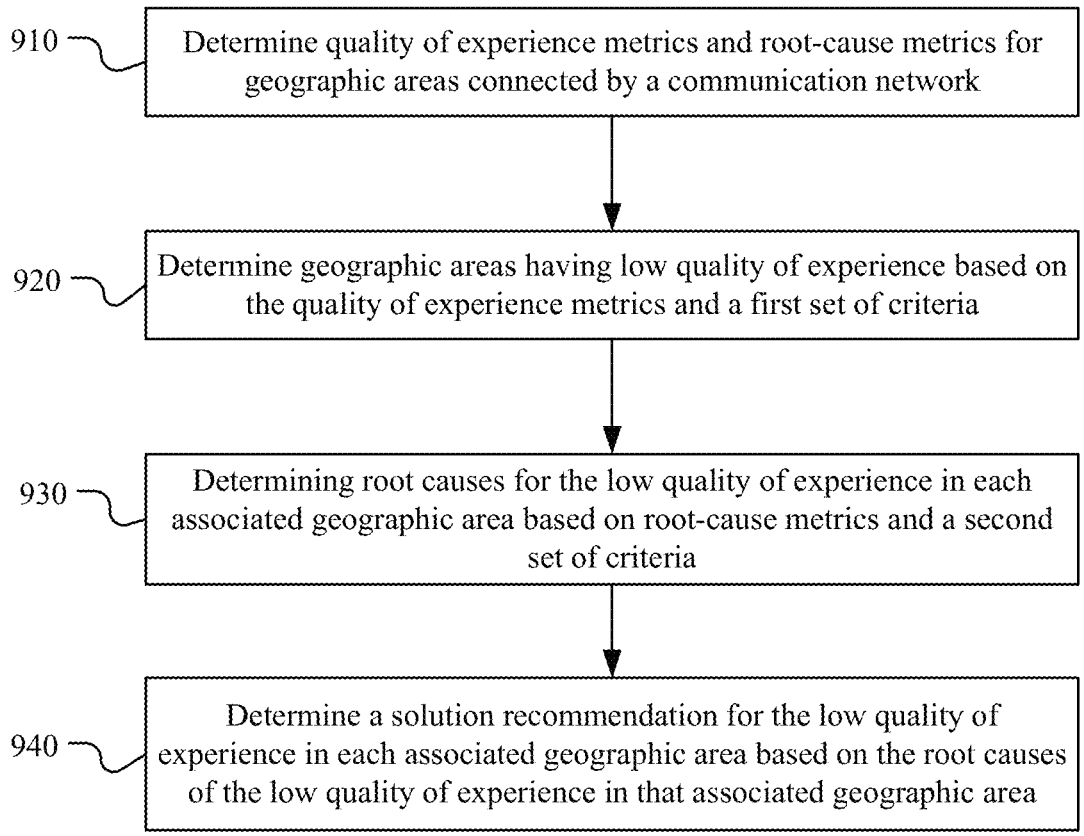
FIG. 9 illustrates an example method of determining causes of low quality of experience in geographic areas connected by a communication network.

FIG. 9 illustrates an example method of determining causes of low quality of experience in geographic areas connected by a communication network. The method may begin at step 910, where in the system may determine, for one or more geographic areas connected by a communication network, one or more quality of experience metrics and one or more root-cause metrics based on application data collected from the one or more geographic areas. In particular embodiments, the one or more quality of experience metrics and root-cause metric may comprise one or more of a download speed, a download speed of busy hours, a network latency at all hours, a network latency at busy hours, a downstream latency, an upstream latency, a video quality score, a quality of experience score, a packet loss metric, a signal strength, a congestion indicator, a network latency, a number of samples, etc. At step 920, the system may determine that one or more of the geographic areas have low quality of experience based on the one or more quality of experience metrics and a first set of criteria. In particular embodiments, the first set of criteria comprises one or more first thresholds for the one or more quality of experience metrics. In particular embodiments, the system may determine a percentile value for each quality of experience metric of each geographic area of the plurality of geographic areas, and filter the percentile values of the quality of experience metrics of the plurality of geographic areas using the one or more first thresholds. The one or more of the geographic areas may be determined to have low quality of experience when each of these geographic areas has at least one quality of experience metric percentile value being worse than the one or more first thresholds.

At step 930, the system may determine one or more causes for the low quality of experience in each associated geographic area based on the one or more root-cause metrics and a second set of criteria. In particular embodiments, the second set of criteria may comprise one or more second thresholds for the one or more root-cause metrics. In particular embodiments, the root-cause thresholds may be looser than the QoE thresholds. In particular embodiments, the system may determine a percentile value for each root-cause metric of each geographic area having low quality of experience among all the areas of interest, and filter the percentile values of the root-cause metrics of the one or more geographic areas having low quality of experience using the one or more second thresholds. The one or more of causes may be determined when their corresponding root-cause metric percentile values is above the one or more second thresholds. In particular embodiments, the one or more first thresholds for the one or more quality of experience metrics and the one or more second thresholds for the one or more root-cause metrics may be determined by a machine learning model trained by historical data or pre-labeled data. As step 940, the system may determine a solution recommendation for the low quality of experience in each associated geographic area based on the one or more causes of the low quality of experience in that associated geographic area.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining root causes of low quality of experience in geographic areas connected by a communication network including the particular steps of the method of FIG. 9, this disclosure contemplates any suitable method for determining root causes of low quality of experience in geographic areas connected by a communication network including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

System Overview

Figure 10:
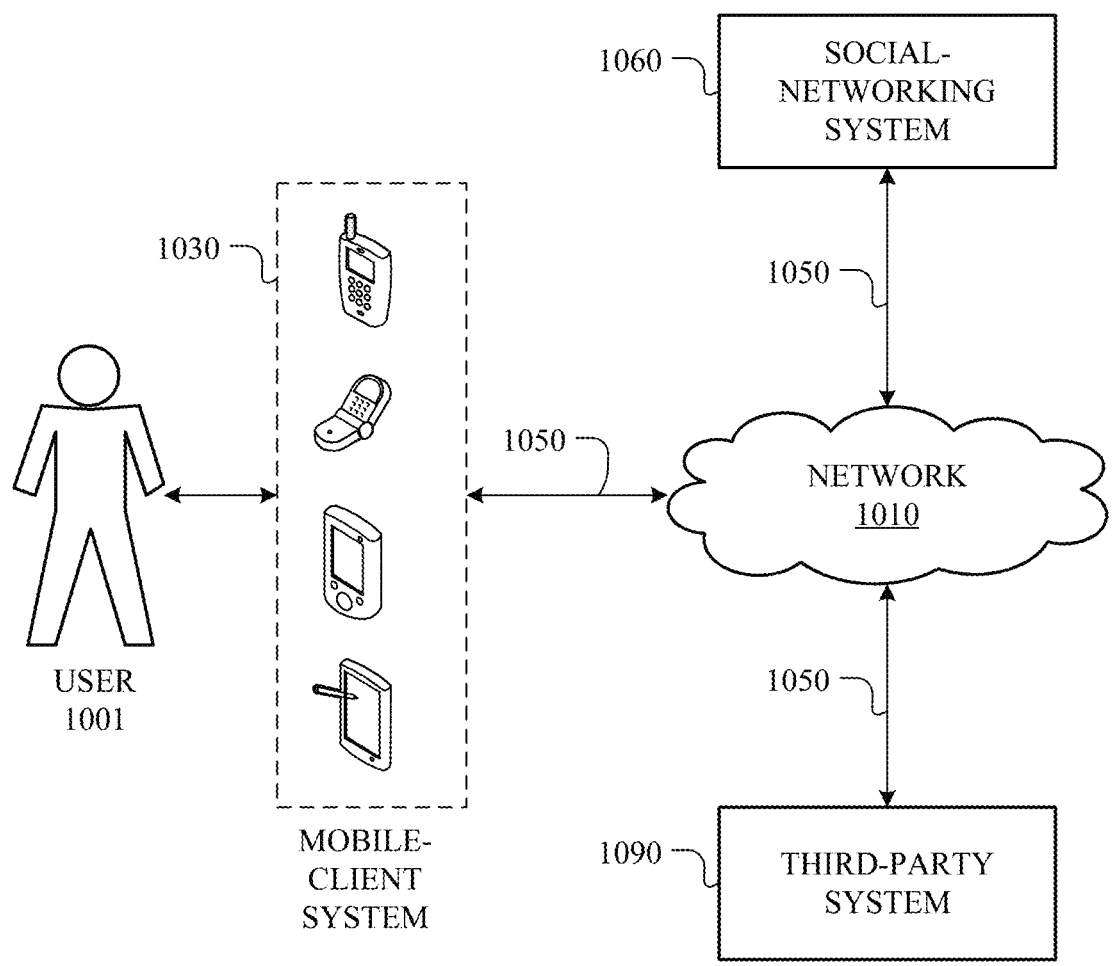
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser 1032, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 1060 or shared with other systems (e.g., third-party system 1070). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1070, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1062 may be authorization/privacy servers for enforcing privacy settings. In response to a request from a user (or other entity) for a particular object stored in a data store 1064, social-networking system 1060 may send a request to the data store 1064 for the object. The request may identify the user associated with the request and may only be sent to the user (or a client system 1030 of the user) if the authorization server determines that the user is authorized to access the object based on the privacy settings associated with the object. If the requesting user is not authorized to access the object, the authorization server may prevent the requested object from being retrieved from the data store 1064, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 11:
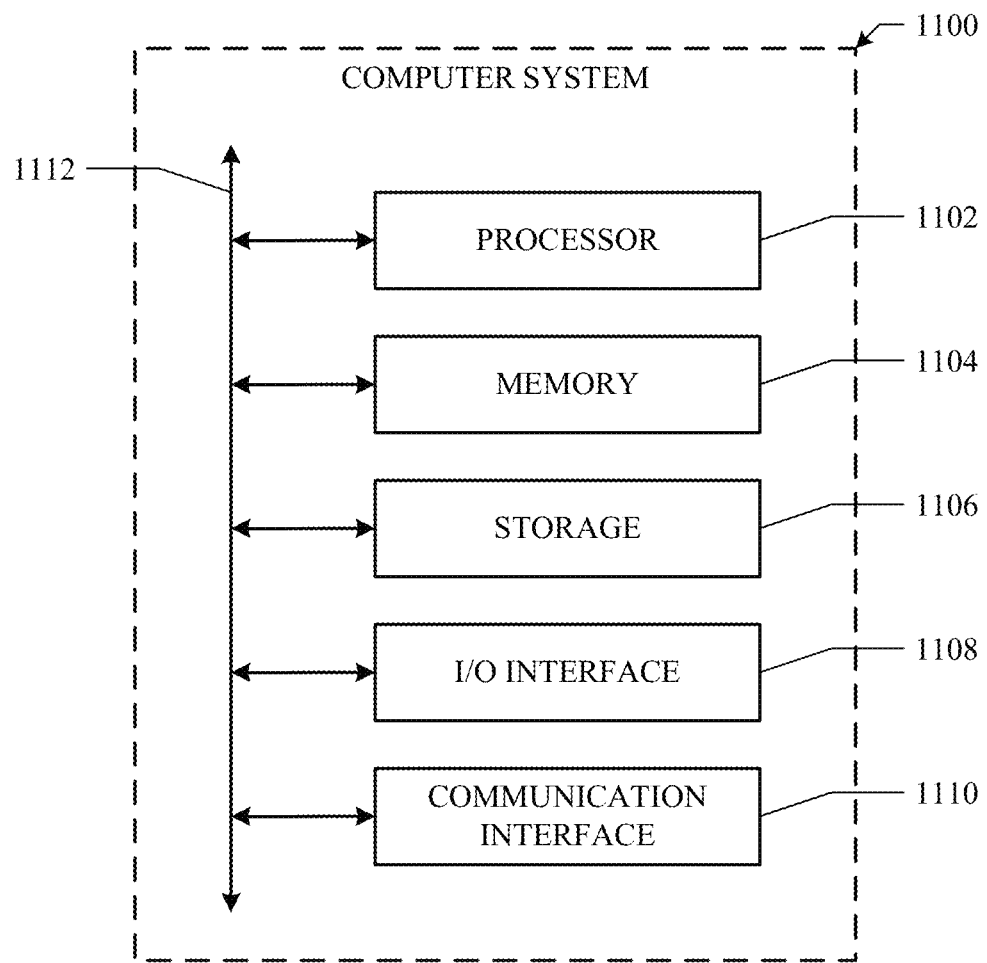
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving, from a client system, a request for a quality of experience report associated with a plurality of geographic areas connected by a communication network;
    accessing a plurality of quality of experience metrics from the plurality of geographic areas, respectively;
    identifying one or more of the plurality of geographic areas that have low quality of experiences based on their respective quality of experience metrics and a set of criteria, wherein the set of criteria comprises one or more thresholds corresponding to the quality of experience metrics;
    determining, for each identified geographic area, a severity of the low quality of experiences, wherein the severity is based on a connection demand metric associated with each geographic area;
    determining a priority score for each geographic area having low quality of experiences based on the severity of the low quality of experiences for each geographic area; and
    sending, to the client system, instructions for presenting the quality of experience report, wherein the quality of experience report indicates the severity of the low quality of experiences for each identified geographic area, and wherein the identified geographic areas are presented based on their respective priority scores.

2. The method of claim 1, wherein identifying the one or more of the plurality of geographic areas that have low quality of experiences comprises:
    determining a percentile value for each quality of experience metric of each geographic area of the plurality of geographic areas; and
    filtering the percentile values of the quality of experience metrics of the plurality of geographic areas using the one or more thresholds, wherein the one or more of the geographic areas are determined to have low quality of experiences when each of these geographic areas has at least one quality of experience metric percentile value being above the one or more thresholds.

3. The method of claim 1, wherein the quality of experience report comprises a solution recommendation for the low quality of experiences for each identified geographic area.

4. The method of claim 3, wherein the solution recommendation comprises one or more recommendation actions comprising one or more of:
- upgrading network;
- network densification;
- network traffic offloading; or
- network load balancing.

5. The method of claim 1, wherein the quality of experience report comprises a user interface, wherein the user interface comprises a map indicating the severity of the low quality of experiences for each identified geographic areas.

6. The method of claim 5, wherein the user interface is configurable to indicate the quality of experience metrics associated with the low quality of experiences.

7. The method of claim 1, wherein the connection demand metric comprises one or more of:
- a number of samples;
- a number of connected devices;
- a number of connected users;
- an amount of transmitted data;
- a network traffic metric; or
- a revenue metric.

8. The method of claim 1, wherein the plurality of quality of experience metrics comprise one or more of:
- a download speed;
- a download speed of busy hours;
- a network latency at all hours;
- a network latency at busy hours;
- a downstream latency;
- an upstream latency;
- a video quality score;
- a quality of experience score;
- a packet loss metric;
- a signal strength;
- a congestion indicator;
- a network latency; or
- a number of samples.

9. The method of claim 1, wherein the one or more thresholds corresponding to the quality of experience metrics are determined by a machine learning model.

10. One or more computer-readable non-transitory storage media embodying software that is operable when executed to:
- receive, from a client system, a request for a quality of experience report associated with a plurality of geographic areas connected by a communication network;
- access a plurality of quality of experience metrics from the plurality of geographic areas, respectively;
- identify one or more of the plurality of geographic areas that have low quality of experiences based on their respective quality of experience metrics and a set of criteria, wherein the set of criteria comprises one or more thresholds corresponding to the quality of experience metrics;
- determine, for each identified geographic area, a severity of the low quality of experiences, wherein the severity is based on a connection demand metric associated with each geographic area;
- determine a priority score for each geographic area having low quality of experiences based on the severity of the low quality of experiences for each geographic area; and
- send, to the client system, instructions for presenting the quality of experience report, wherein the quality of experience report indicates the severity of the low quality of experiences for each identified geographic area, and wherein the identified geographic areas are presented based on their respective priority scores.

11. The computer-readable non-transitory storage media of claim 10, wherein identifying the one or more of the plurality of geographic areas that have low quality of experiences comprises:
- determining a percentile value for each quality of experience metric of each geographic area of the plurality of geographic areas; and
- filtering the percentile values of the quality of experience metrics of the plurality of geographic areas using the one or more thresholds, wherein the one or more of the geographic areas are determined to have low quality of experience when each of these geographic areas has at least one quality of experience metric percentile value being above the one or more thresholds.

12. The computer-readable non-transitory storage media of claim 10, wherein the quality of experience report comprises a solution recommendation for the low quality of experiences for each identified geographic area.

13. The computer-readable non-transitory storage media of claim 12, wherein the solution recommendation comprises one or more recommendation actions comprising one or more of:
- upgrading network;
- network densification;
- network traffic offloading; or
- network load balancing.

14. A system comprising: one or more non-transitory computer-readable storage media embodying instructions; and one or more processors coupled to the storage media and operable to execute the instructions to:
- receive, from a client system, a request for a quality of experience report associated with a plurality of geographic areas connected by a communication network;
- access a plurality of quality of experience metrics from the plurality of geographic areas, respectively;
- identify one or more of the plurality of geographic areas that have low quality of experiences based on their respective quality of experience metrics and a set of criteria, wherein the set of criteria comprises one or more thresholds corresponding to the quality of experience metrics;
- determine, for each identified geographic area, a severity of the low quality of experiences, wherein the severity is based on a connection demand metric associated with each geographic area;
- determine a priority score for each geographic area having low quality of experiences based on the severity of the low quality of experiences for each geographic area; and
- send, to the client system, instructions for presenting the quality of experience report, wherein the quality of experience report indicates the severity of the low quality of experiences for each identified geographic area, and wherein the identified geographic areas are presented based on their respective priority scores.

15. The system of claim 14, wherein identifying the one or more of the plurality of geographic areas that have low quality of experiences comprises:
- determining a percentile value for each quality of experience metric of each geographic area of the plurality of geographic areas; and filtering the percentile values of the quality of experience metrics of the plurality of geographic areas using the one or more thresholds, wherein the one or more of the geographic areas are determined to have low quality of experience when each of these geographic areas has at least one quality of experience metric percentile value being above the one or more thresholds.

16. The system of claim 14, wherein the quality of experience report comprises a solution recommendation for the low quality of experiences for each identified geographic area.

17. The system of claim 16, wherein the solution recommendation comprises one or more recommendation actions comprising one or more of:
   upgrading network;
   network densification;
   network traffic offloading; or
   network load balancing.

\* \* \* \* \*